US011122028B2

(12) United States Patent
Yabe

(10) Patent No.: US 11,122,028 B2
(45) Date of Patent: Sep. 14, 2021

(54) CONTROL METHOD FOR AUTHENTICATION/AUTHORIZATION SERVER, RESOURCE SERVER, AND AUTHENTICATION/AUTHORIZATION SYSTEM

(71) Applicant: CANON KABUSHIKI KAISHA, Tokyo (JP)

(72) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 15/924,068

(22) Filed: Mar. 16, 2018

(65) Prior Publication Data
US 2018/0278603 A1 Sep. 27, 2018

(30) Foreign Application Priority Data
Mar. 27, 2017 (JP) .............................. JP2017-061886

(51) Int. Cl.
 *H04L 29/06* (2006.01)
 *H04W 12/084* (2021.01)
 *H04L 9/32* (2006.01)
(52) U.S. Cl.
 CPC ........ *H04L 63/0807* (2013.01); *H04L 9/3213* (2013.01); *H04L 63/08* (2013.01);
 (Continued)
(58) Field of Classification Search
 CPC ............ H04W 12/0804; H04W 12/084; H04L 9/3213; H04L 63/08; H04L 63/10; H04L 63/0807; H04L 63/0892; H04L 63/0853
 See application file for complete search history.

(56) References Cited

U.S. PATENT DOCUMENTS 9,537,865 B1 * 1/2017 Borovoy ............... H04L 63/108
10,084,780 B2 * 9/2018 Bao .................... H04W 12/0608
(Continued)

FOREIGN PATENT DOCUMENTS

JP 2007-149010 A 6/2007

OTHER PUBLICATIONS

Jones et al, The OAuth 2.0 Authorization Framework: Bearer Token Usage, Oct. 2012, Internet Engineering Task Force (IETF), RFC 6750 URL: https://tools.ietf.org/html/rfc6750 (Year: 2012).*

(Continued)

*Primary Examiner* — Victor Lesniewski
(74) *Attorney, Agent, or Firm* — Canon U.S.A., Inc. I.P. Division

(57) ABSTRACT

An authorization server to issue an access token for accessing a resource provided by a resource server performs operations. A client receives an issuance request having a predetermined parameter identifying a type of access token to be issued. Based on the predetermined parameter, one of a first type or second type of access token to be verified by the resource server is issued. The first type of access token or the second type of access token is transmitted to the client from which the issuance request was received. The second type of access token is verified at the authorization server by receipt of a verification request received together with the second type of access token from the resource server. The received verification request is transmitted from the resource server based on the resource server determining that a request for service from the client includes the second type of access token.

19 Claims, 14 Drawing Sheets

(52) U.S. Cl.
CPC ...... *H04L 63/0853* (2013.01); *H04L 63/0892* (2013.01); *H04L 63/10* (2013.01); *H04W 12/084* (2021.01)

(56) References Cited

U.S. PATENT DOCUMENTS

| | | | | |
|---|---|---|---|---|
| 10,104,084 | B2* | 10/2018 | Biggs | H04L 63/08 |
| 2006/0265760 | A1* | 11/2006 | Daemke | G06F 21/604 |
| | | | | 726/27 |
| 2013/0007858 | A1* | 1/2013 | Shah | H04L 63/0815 |
| | | | | 726/6 |
| 2013/0185784 | A1* | 7/2013 | Tamura | H04L 63/10 |
| 2014/0026193 | A1* | 1/2014 | Saxman | G06F 21/33 |
| | | | | 726/4 |
| 2014/0040993 | A1* | 2/2014 | Lorenzo | G06F 21/41 |
| | | | | 726/4 |
| 2014/0068746 | A1* | 3/2014 | Gonzalez Martinez | |
| | | | | G06F 21/335 |
| | | | | 726/9 |
| 2014/0189799 | A1* | 7/2014 | Lu | H04L 63/08 |
| | | | | 726/4 |
| 2014/0355034 | A1* | 12/2014 | Mihara | G06F 3/1238 |
| | | | | 358/1.14 |
| 2014/0380428 | A1* | 12/2014 | Kobayashi | G06F 21/335 |
| | | | | 726/4 |
| 2015/0128237 | A1* | 5/2015 | Lund | H04L 9/3213 |
| | | | | 726/7 |
| 2015/0150106 | A1* | 5/2015 | Lund | H04L 63/083 |
| | | | | 726/7 |
| 2015/0150109 | A1* | 5/2015 | Bocanegra | H04L 63/0807 |
| | | | | 726/9 |
| 2015/0235042 | A1* | 8/2015 | Salehpour | G06F 21/44 |
| | | | | 726/4 |
| 2015/0350179 | A1* | 12/2015 | Kobayashi | H04L 63/08 |
| | | | | 726/4 |
| 2016/0028737 | A1* | 1/2016 | Srinivasan | H04L 63/20 |
| | | | | 726/1 |
| 2016/0072839 | A1* | 3/2016 | Mortimore, Jr. | H04L 63/20 |
| | | | | 726/1 |
| 2016/0205108 | A1* | 7/2016 | Si | H04L 67/02 |
| | | | | 726/4 |
| 2017/0048233 | A1* | 2/2017 | Khylkouskaya | H04L 63/083 |
| 2017/0142108 | A1* | 5/2017 | Zhang | H04L 63/0823 |
| 2017/0324719 | A1* | 11/2017 | Mason | H04L 63/08 |
| 2017/0331832 | A1* | 11/2017 | Lander | H04L 63/0807 |
| 2017/0346807 | A1* | 11/2017 | Blasi | G06F 21/105 |
| 2018/0211055 | A1* | 7/2018 | Balijepalli | G06F 21/6218 |

OTHER PUBLICATIONS

Ethelbert, Obinna; Moghaddam, Faraz Fatemi; Wieder, Philipp; Yahyapour, Ramin; "A JSON Token-Based Authentication and Access Management Schema for Cloud SaaS Applications", 5th International Conference on Future Internet of Things and Cloud (FiCloud), IEEE, Aug. 21-23, 2017, pp. 47-53.*

Solapurkar, Prajakta; "Building Secure Healthcare Services Using OAuth 2.0 and JSON Web Token in IOT Cloud Scenario", 2nd International Conference on Contemporary Computing and Informatics (IC3I), IEEE, Dec. 14-17, 2016, pp. 99-104.*

* cited by examiner

FIG. 7

```
EXAMPLE OF SIGNED ACCESS TOKEN eyJraWQiOiJrMSIsImFsZyI6IiJTMjU2In0.eyJpc3MiOiJodHRwczovL2F1dGgtc2Vydm
ljZS5leGFtcGxlLmNvbSIsImF1ZCI6Imh0dHBzOi8vcHJpbnQtc2VydmljZS5leGFtcGxlL
mNvbSIsImV4cCI6MTQ3Mzc0NzIxNSwianRpIjoiYjI2NTJmNmQ3NWIxNGFhNDIhZGZlO
DliODgwOGIzMzdlZjI3NmU4ZDEzNjM0MDBkOThmYWIxMDBjNzQ2M2RmMCIsImlhdCI
6MTQ3Mzc0NjYxNSwibmJmIjoxNDczNzQ2NDk1LCJzdWIiOiIxY2U0MmY3NC0xMjI1LT
RjYmItYjJzZi1mNTI1ZGFiYzNjZmQiLCJhdXRoejpzY29wZXMiOisiY2xpZW50LkZvcm1D
bGllbnQiLCJjbGllbnQuUHJpbnRDbGllbnQiXSwiZXh0OmZuYW1lIjoiSm9obiIsImV4dDps
bmFtZSI6IkRvZSIsImV4dDpsb2NhbGUiOiJlbl9VUy51dGYtOCIsImV4dDp0ZW5hbnRpZ
EByZWNtljoiMTcwQkEiLCJleHQ6ZW1haWxzAcmVxljoiam9obi5kb2VAZXhhbXBsZS5jb2
0iLCJleHQ6YXBwaWQiOil0MmM1YTk2MjYwOTg0NTIIOTZkNGJhY2Q3M2MyOTgyMz
M5MmE3NmEwMmNjOTRkMzY5ODViN2RjMGQ3OTBiOWE0In0.O4TpYbDBFq0g20TG
ZwzZH97Cn80NtdcvutHDBlwUsOX1T_7nOCJNJq9F3KdFgCYApPFtzpQqhUfdZGgrK
mJC8iBYAqWj7CExS9Qw4WlTeZoawBXuGq8KC80PGES7uFKRPDPM1sDggjblt_nGWh
4QgrwrUxLkH8SFOgShaYtWMpXxccPR2GavlOLXqb4ZgXbhmxltrcOzX0n81qc24EJeH
e-
8wGAICMk4YRdjfBnwUWA9be1oOUYI_NGXM2G7XdEPzA5ydtlZ69kWHZzCsPpmalHl8
3EmxMHlu7Hde7DREHehRiltm4A_rb1uN_wMjUB4887qt95cVIOeJbPyYk9YhA
```

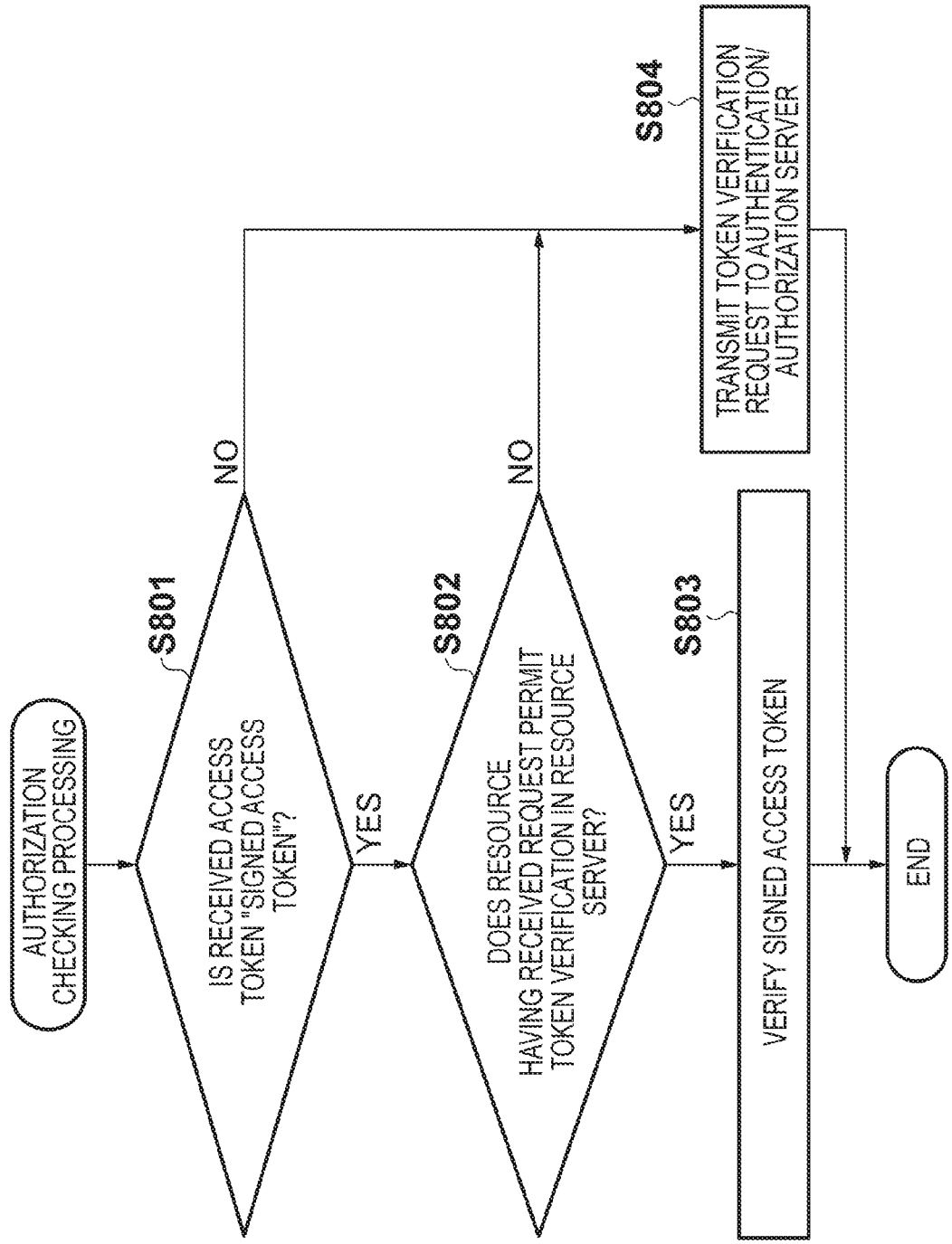

FIG. 14

```
POST /v0/authorization/token HTTP/1.1          ┌─1410
 Host: server.example.com
 Authorization: Basic YTpi
 Content-Type: application/x-www-form-
 urlencoded;charset=UTF-8

┌─────────────────────────────────┐
 │ grant_type=client_credentials&  │──1411
 └─────────────────────────────────┘ client_id=241332ca&
 scope=owner.PrintService
```

```
POST /v0/authorization/token HTTP/1.1          ┌─1420
 Host: server.example.com
 Authorization: Basic YTpi
 Content-Type: application/x-www-form-urlencoded;charset=UTF-8

┌─────────────────────────────────┐
 │ grant_type=authorization_code&  │──1421
 └─────────────────────────────────┘ client_id=john.doe@170BA&
 code=i1WsRn1uB1&
 redirect_uri=https%3A%2F%2Fhoge%2Ecom
```

CONTROL METHOD FOR AUTHENTICATION/AUTHORIZATION SERVER, RESOURCE SERVER, AND AUTHENTICATION/AUTHORIZATION SYSTEM

BACKGROUND OF THE INVENTION

Field of the Invention

The present invention relates to an authentication/authorization server, a resource server, an authentication/authorization system, an authentication method, and a program which use a signed access token.

Description of the Related Art

In recent years, so-called cloud services developed on the Internet have been widely used. In addition, such cloud services have released Application Programming Interfaces (APIs) for Web services, which enables use of functions provided via the APIs from other applications or cloud services. In the Web service APIs, a standard protocol called OAuth 2.0 for implementing cooperation with an authorization has been widely employed.

According to OAuth 2.0, for example, the API for acquiring data of a user managed by a certain service A can be accessed by a service B within a range authorized by the user. At this time, the service A unveils the range accessed from the service B and then obtains a user's explicit authorization for the access to the API from the service B. The operation in which a user provides an explicit authorization is referred to as an authorization operation. The access range is referred to as a scope in OAuth 2.0, and a range of access to data is determined by the scope.

When the user performs the authorization operation, the service B receives a token (hereinafter referred to as an access token) to prove the authorization of access to data within the range permitted by the user in the service A. The subsequent access to the API in the service A can be implemented using the access token (also referred to as an authorization token). The authorization of access to user data by the service B in the user authorization operation is referred to as empowerment. In OAuth 2.0, a server that issues the access token based on the authorization operation by the user is referred to as an authorization server. The authorization server that also includes an authentication function is referred to as an authentication/authorization server. A server that releases the API is referred to as a resource server. A subject that calls the API is referred to as a client.

In OAuth 2.0, the authorization server and the resource server can be configured as the same server. However, in a large system in which various types of resource servers are present, the authorization server is generally configured as an independent server. In this the authorization server to verify the acquired access token every time the API is used by the service B. Whether the API can be used is determined based on the result of the verification. In this case, there is a problem that a load is concentrated on the authorization server in a large system.

To deal with such a problem, for example, as discussed in Japanese Patent Laid-Open No. 2007-149010, a method is known in which authorization information (token ID, scope, expiration time, etc.) and information (user ID, client ID, user name, e-mail address, etc.) associated with tokens are preliminarily added to the access token issued by the authorization server, thereby enabling the resource server itself to verify the access token, which leads to a reduction in load on the authorization server. A signed access token is known as means for verifying the access token by the service A itself, without the need for the service A to request the authorization server to verify the access token. As the signed access token, JSON Web Token (JWT) and JSON Web Signature (JWS) are known. The use of these types of access tokens enables the service A to determine whether the access token is valid by verifying the signature of the received signed access token, without the need for confirmation to the authorization server.

SUMMARY OF THE INVENTION

According to an embodiment, an authorization server is configured to issue an access token for accessing a resource provided by a resource server. The authorization server includes a unit configured to issue one of a first access token to be verified by the resource server, and a second access token to be verified by the authorization server, according to an issuance request for issuing an access token from a client, based on a predetermined parameter for the issuance request. The authorization server also includes a unit configured to transmit, to the client having sent the issuance request, one of the first access token issued and the second access token issued and a unit configured to verify the second access token according to a verification request received together with the second access token.

According to another embodiment, a resource server that provides a resource includes a first determination unit configured to determine whether an access token received together with a request for a resource is a first access token to be verified by the resource server, or a second access token to be verified by an authorization server. The resource server also includes a second determination unit configured to determine, when the received access token is determined to be the first access token, whether to permit verification of the first access token for the resource requested and a verification unit configured to verify the first access token according to a result of a determination that the verification of the first access token is permitted.

According to still another embodiment, an authentication/authorization system includes a resource server and an authorization server configured to issue an access token for accessing a resource provided by the resource server. In the authentication/authorization system, the authorization server includes a unit configured to issue one of a first access token to be verified by the resource server, and a second access token to be verified by the authorization server, according to an issuance request for issuing an access token from a client, based on a predetermined parameter for the issuance request. The authorization server also includes a unit configured to transmit, to a client having sent the issuance request, one of the first access token issued and the second access token issued and a unit configured to verify the second access token according to a verification request received together with the second access token. The resource server includes a first determination unit configured to determine whether an access token received together with a request for a resource is a first access token to be verified by the resource server, or a second access token to be verified by an authorization server and a second determination unit configured to determine, when the received access token is determined to be the first access token, whether to permit verification of the first access token for the resource requested. The resource server also includes a verification unit configured to verify the first access token according to a result of a determination that the verification of the first access token is permitted.

Further features of the present invention will become apparent from the following description of exemplary embodiments (with reference to the attached drawings).

BRIEF DESCRIPTION OF THE DRAWINGS

FIG. 7 is a diagram illustrating an example of a signed access token.

FIG. 8 is a flowchart illustrating authorization checking processing carried out in step S504 by a resource server 103 in the first exemplary embodiment.

FIG. 14 is a diagram illustrating an HTTP request of an access token issuance request.

DESCRIPTION OF THE EMBODIMENTS

Authorization information about a signed access token issued in the authorization server and information associated with the token, such as user information and client information, may be changed by the authorization server within an expiration time of the access token. In this case, the resource server that verifies the signed access token cannot check the change made by the authorization server. In order for the resource server to check the current authorization information about the signed access token and information associated with the token that are changed by the authorization server, there is a need to send an inquiry to the authorization server during token verification. In this case, however, like in the token verification and information acquisition of the authorization server in the specifications, implementation, and the like of OAuth 2.0 of related art, a load, on the token verification and information acquisition of the authorization server increases as the numbers of clients and resource servers increase. In addition, when the resource server performs the token verification and information acquisition on the authorization server every time, the performance of the resource server deteriorates. Thus, it has been difficult to permit a change in the authority or attribute associated with the issued access token, while achieving a reduction in load on the authorization server.

The present invention has been made in view of the above-described related art and is directed to providing an authentication/authorization server, a resource server, an authentication/authorization system, an authentication method, and a program which are capable of selecting a server to verify an access token.

According to certain embodiments, it is possible to select a server to verify an access token. This enables both a reduction in load on the authorization server and permission of a change in an authority or attribute associated with an issued access token, which leads to an increase in the performance of the resource server.

Modes for carrying out embodiments will be described below with reference to the drawings.

First Exemplary Embodiment

Figure 1:
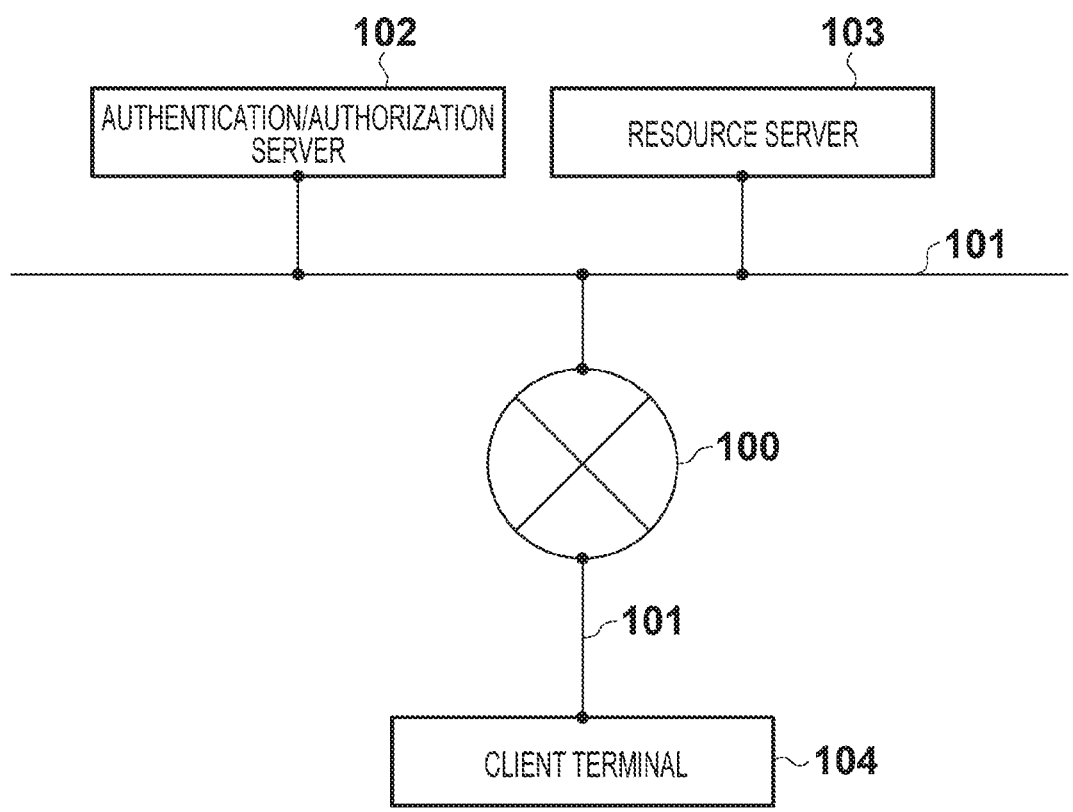
FIG. 1 is a network configuration diagram according to a first exemplary embodiment.

In a first exemplary embodiment, assume that an application is installed in each server on the Internet. Also assume that the application installed in each server cooperates with a client terminal and provides various functions. An entity that provides such functions is referred to as a service, and provision of the functions to service. An authentication/authorization system which is an information processing system according to the present exemplary embodiment is implemented on a network having a configuration as illustrated in FIG. 1, and then an authentication method is executed.

<Configurations of Authentication/Authorization System and Device>

A wide area network (hereinafter abbreviated as WAN) 100 such as the World Wide Web (hereinafter abbreviated as WWW or Web) system is provided. A LAN 101 is a local area network (hereinafter abbreviated as LAN) for connecting components.

An authentication/authorization server 102 is an authentication/authorization server for implementing the authentication and OAuth for a user and a client terminal. Specifically, the authentication/authorization server 102 can issue an access token according to a request and verify the access token according to a verification request. A resource server 103 is a resource server that provides various services. In the present exemplary embodiment, the number of each of the installed authentication/authorization servers 102 and resource servers 103 is one. However, a plurality of authentication/authorization servers 102 and a plurality of resource servers 103 may be configured. In addition, in the exemplary embodiment, the authentication/authorization server 102 and the resource server 103 are connected via the LAN 101, but instead may be connected via the WAN 100. The authentication/authorization server 102 may be connected via a database server, which is not illustrated, and the LAN 101 to store data used by an authentication/authorization module described below. Further, the authentication/authorization server 102 and the resource server 103 may be configured as a piece of hardware.

A client terminal 104 is a client terminal, such as a personal computer, a mobile terminal, or an image forming apparatus, which transmits and receives data to and from the authentication/authorization server 102 and the resource server 103. One or more resource service cooperation applications, which are described below, are installed, in the client terminal 104. By using services provided by the resource server 103, the client terminal 104 provides a user with services according to the functions provided by the client terminal 104.

Figure 2:
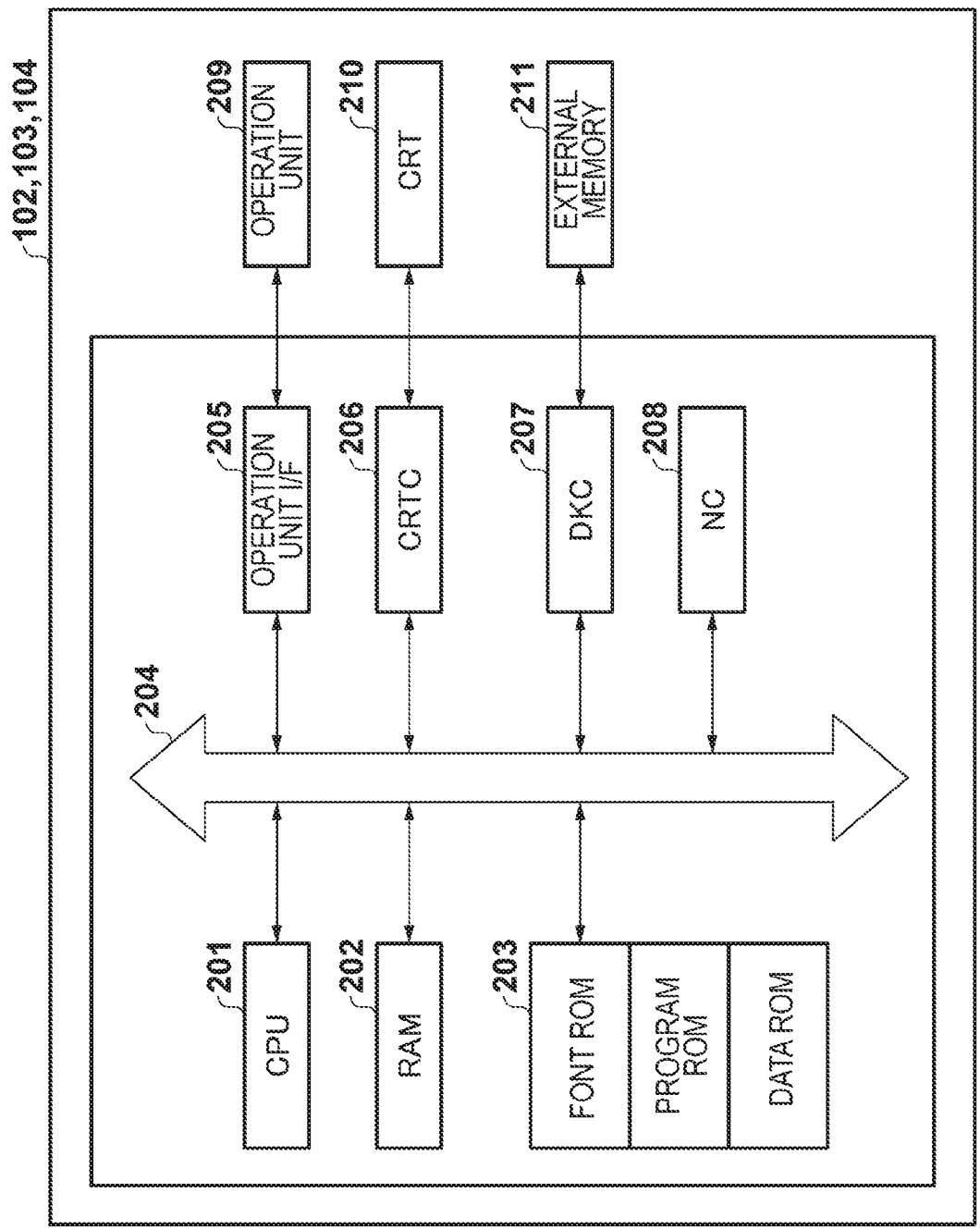
FIG. 2 is a hardware configuration diagram.

FIG. 2 is a diagram illustrating a general hardware configuration of an information processing device constituting the authentication/authorization server 102, the resource server 103, and the client terminal 104 according to the present exemplary embodiment. A central processing unit (CPU) 201 executes programs such as an operating system (hereinafter abbreviated as OS) and applications that are stored in a program read-only memory (ROM) of a ROM 203 or are loaded into a random access memory (RAM) 202 from, an external, memory 211 such as a hard disk. The CPU 201 controls blocks each connected to a system bus 204. Processing of each sequence described below can be implemented in such a manner that the programs are executed by the CPU 201.

The RAM 202 functions as a main memory, a work area, or the like of the CPU 201. An operation unit interface (I/F) 205 controls an input from an operation unit 209. A CRTC 206 is a CRT controller that controls a display of a CRT display 210. A DKC 207 is a disk controller that controls a data access in the external memory 211, such as a hard disk, which stores various data. An NC 208 is a network controller that executes communication control processing for controlling communication with a server computer or another device connected via the WAN 100 or the LAN 101. In the following descriptions, unless otherwise noted, the subject of hardware to be executed is the CPU 201, and the subject of software is an application program installed in the external memory 211.

Figure 3:
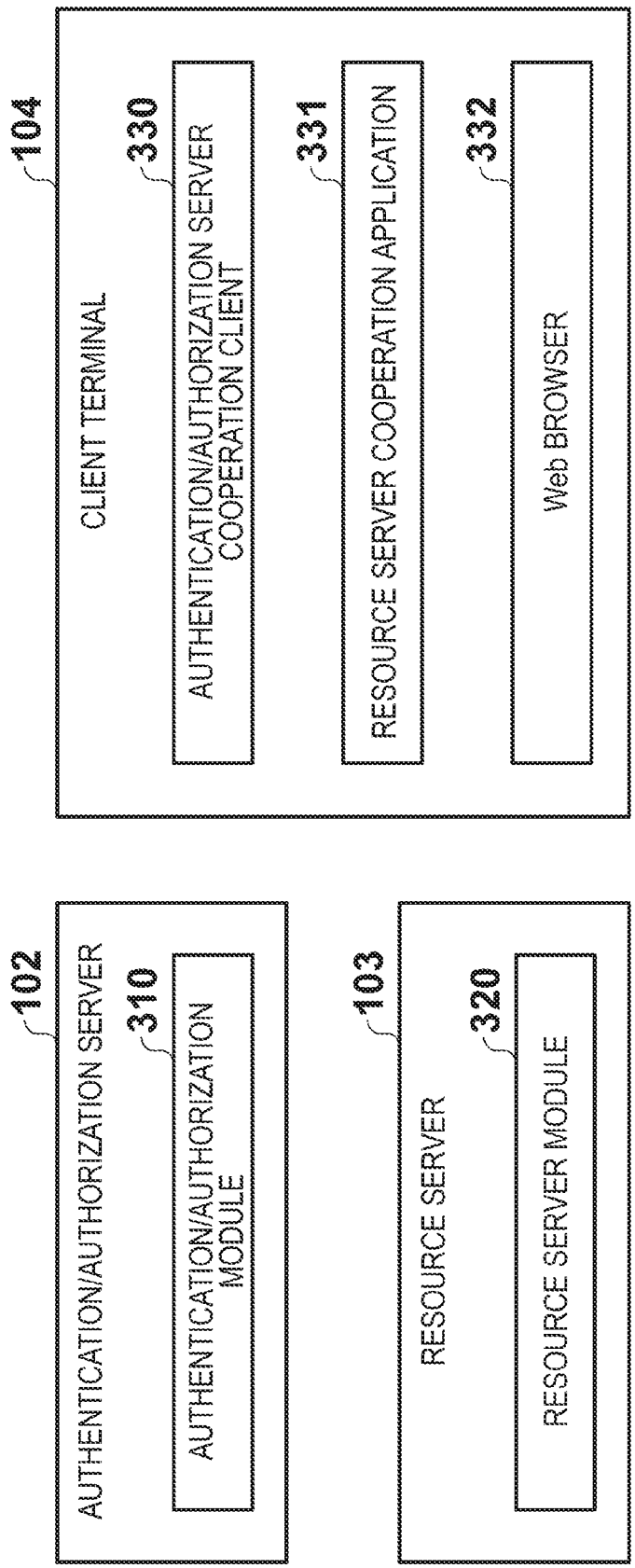
FIG. 3 is a software configuration diagram.

FIG. 3 is a diagram illustrating a software module configuration of each of the authentication/authorization server 102, the resource server 103, and the client terminal 104 according to the present exemplary embodiment. Functions are implemented in such a manner that modules are executed by the components.

The authentication/authorization server 102 includes an authentication/authorization module 310. The authentication/authorization module 310 performs authentication processing for the user or the client terminal 104, authorization processing in the authenticated user or client terminal 104, access token issuance processing, and bearer access token verification processing.

Figure 4:
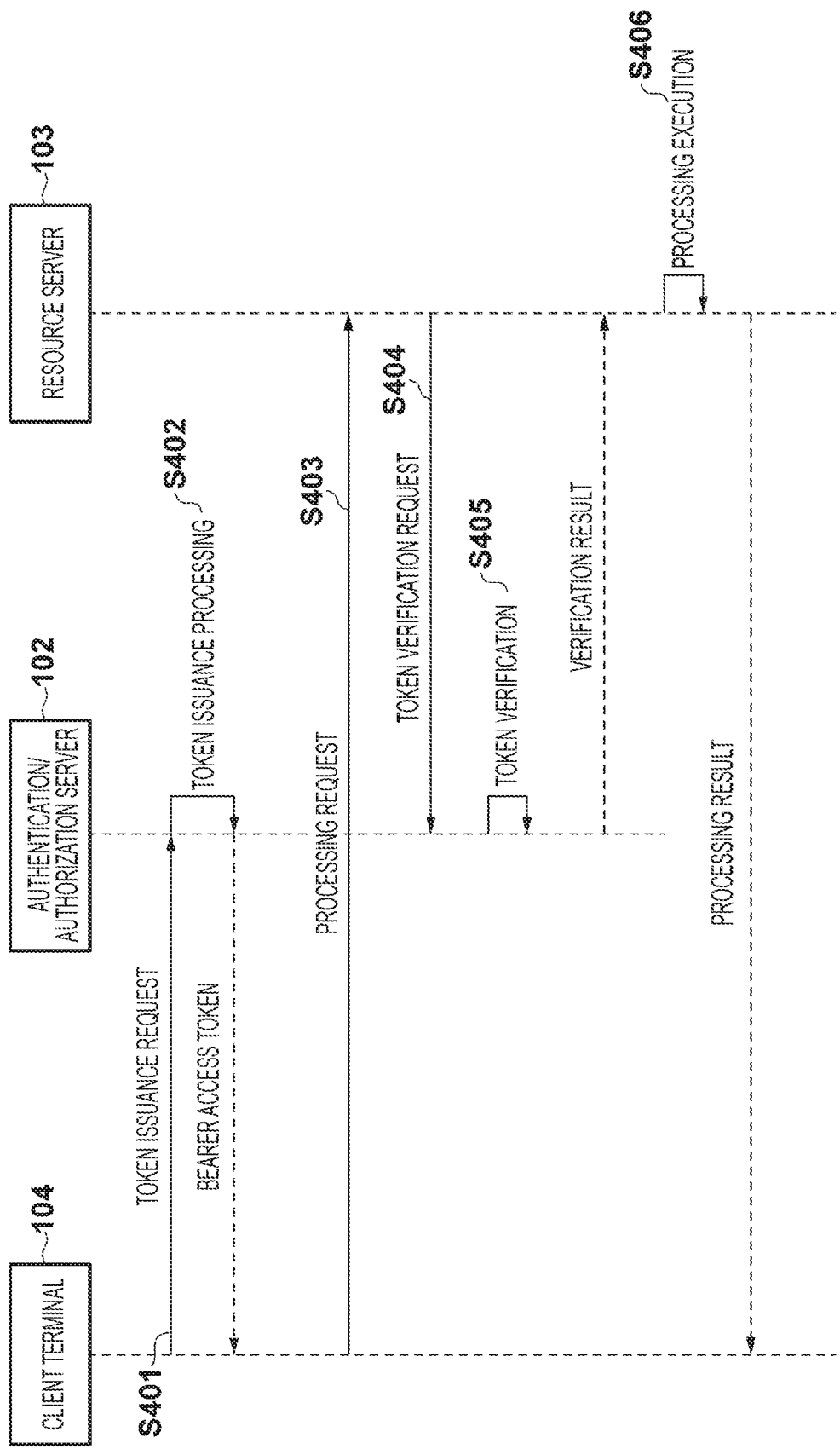
FIG. 4 is a diagram illustrating an access token issuance sequence in OAuth 2.0.
Figure 5:
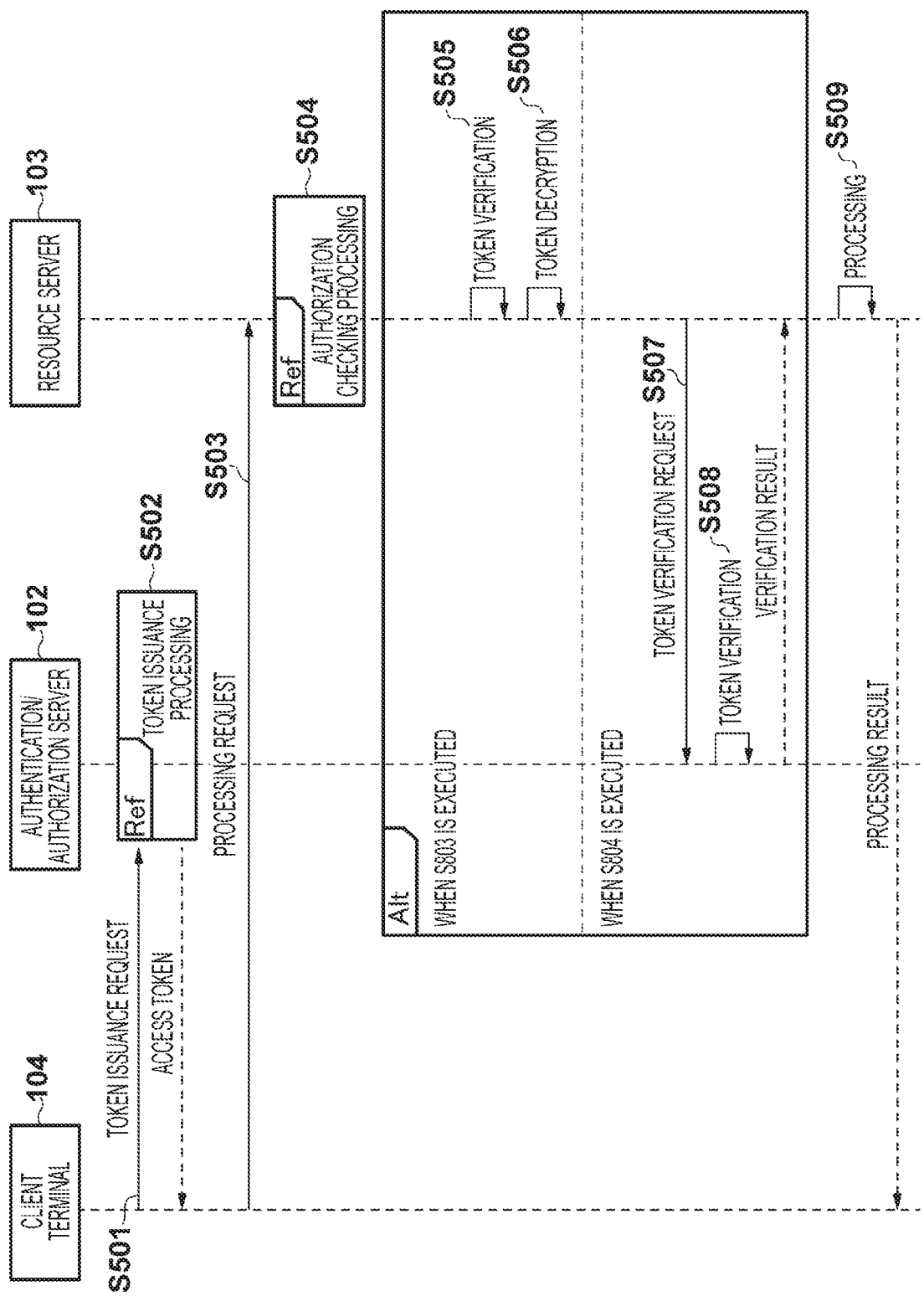
FIG. 5 is a diagram illustrating a signed access token issuance sequence.

In the present exemplary embodiment, among the access tokens issued by the authentication/authorization server 102, an access token according to the present exemplary embodiment that is required to send an inquiry to the authentication/authorization server 102 during acquisition of authorization information has no digital signature as illustrated in FIG. 4. This access token is referred to as a bearer access token. In addition, among the access tokens issued by the authentication/authorization server 102 according to the present exemplary embodiment, as illustrated in FIG. 5, the access token according to the present exemplary embodiment during acquisition of authorization information is provided with a digital signature. This access token is referred to as a signed access token so as to be distinguished from the bearer access token. In the exemplary embodiment, if there access token or the signed access token, the access tokens issued by the authorization server 102 are collectively referred to as an access token.

The resource server 103 includes a resource server module 320. The resource server module 320 releases the API as a Web service, receives a service provision request from the client terminal 104, and provides a service. In response to the service provision request from the client terminal 104, signed access token verification processing is performed to determine whether to provide a service.

The client terminal 104 includes an authentication/authorization server cooperation client 330 and a resource server cooperation client 331. The client terminal 104 may include a Web browser 332 which is a user agent for using WWW. However, the Web browser 332 is not an indispensable module.

The authentication/authorization server cooperation client 330 performs, from the authentication/authorization server 102, a request for authenticating a user or client, a request for issuing an access token, or acquisition of an access token.

The resource server cooperation application 331 is an application to receive service provision from the resource server 103. The resource server cooperation application 331 receives service provision from the resource server 103 by the following procedure. First, the resource server cooperation application 331 requests the authentication/authorization server cooperation client 330 to issue an access token. The authentication/authorization server cooperation client 330 acquires, from the authentication/authorization server 102, the access token corresponding to the service required by the resource server cooperation application 331. The authentication/authorization server cooperation client 330 returns the acquired access token to the resource service cooperation application 331 which has sent the request. The resource service cooperation application 331 can receive service provision by sending a resource request to the resource server 103 using the acquired access token.

<Bearer Access Token>

FIG. 4 is a sequence diagram illustrating a flow of issuance and verification of a bearer access token. The issuance and verification of an access token are implemented in cooperation by the authentication/authorization server 102, the resource server 103, and the client terminal 104.

In step S401, the client terminal 104 transmits authentication information or authorization code to the authentication/authorization server 102, and performs the access token issuance request. Information to be transmitted and a processing flow when the client terminal requests the authentication/authorization server 102 to issue an access token vary depending on whether the client terminal is the owner of the requested resource. The owner is an entity that permits access to the resource.

When the client terminal 104 is the owner of the resource for which the issuance of an access token is requested, the client terminal 104 itself performs authentication processing as the owner. Accordingly, the client terminal 104 transmits the authentication information to the authentication/authorization server 102. When the client terminal 104 requests an access token based on the empowerment from another owner, the client terminal 104 receives, from the owner, the authentication code issued by the authentication/authorization server 102, and transmits the authorization code together with the token issuance request to the authentication/authorization server 102.

In step S402, the authentication/authorization server 102 checks the information received together with the token issuance request from the client terminal 104 and issues a bearer access token to the client terminal 104.

In step S403, the client terminal 104 uses the access token acquired in step S401 and requests the resource server 103 to provide a service.

In step S404, the resource server 103 transmits the access token received from the client terminal 104 to the authentication/authorization server 102 before executing processing on the service requested from the client terminal 104, and checks whether the received access token is an appropriate token for executing processing on the service.

In step S405, the authentication/authorization server 102 verifies the access token received from the resource server 103 and returns, to the resource server 103, a result of a determination whether the received access token is appropriate for providing the service requested by the client terminal 104.

In step S406, the resource server 103 executes processing on the service according to the result of verifying the access token received from the authentication/authorization server 102, and returns the result to the client terminal 104.

<Signed Access Token>

Next, the signed access token according to the present exemplary embodiment will be described. In the present exemplary embodiment, a JWS or JWT technique is used, instead of a normal access token, to implement the signed access token including user information associated with the access token, such as access token information and resource owner information. Hereinafter, JSON Web Signature (JWS) used in the present exemplary embodiment is means for protecting and expressing a content represented, by JSON Token (JWT) by using a digital signature or Message Authentication Codes (MACs). JWT is a method for expressing URL-safe claims using a data structure based on JavaScript Object Notation (JSON). JWS and JWT are standardized and released as RFCs (RFC7515 (JWS), RFC7519 (JWT)). Claims included in JWS used in the present exemplary embodiment are described below. A claim is a main body part of a token and examples of the content of each claim are illustrated in Table 1.

TABLE 1

CLAIMS INCLUDED IN JWS

| | CLAIM NAME CLASS | CLAIM NAME | CLAIM CONTENT |
|---|---|---|---|
| 1 | Registered Claim | "iss" (Issuer) | IDENTIFIER OF ISSUER OF JWT |
| 2 | | "sub" (Subject) | IDENTIFIER OF SUBJECT OF JWT |
| 3 | | "aud" (Audience) | LIST OF IDENTIFIERS OF SUBJECTS ASSUMED TO USE JWT |
| 4 | | "exp" (Expiration Time) | EXPIRATION TIME OF JWT |
| 5 | | "nbf" (Not Before) | DATE/TIME WHEN JWT IS VAILD |
| 6 | | "iat" (Issued At) | TIME WHEN JWT IS ISSUED |
| 7 | | "jti" (JWT aidhi) | UNIQUE IDENTIFIER FOR JWT (ACCESS TOKEN ID) |
| 8 | Private Claim | "authz:scopes" | ACCESS TOKEN SCOPE LIST |
| 9 | | "authz:client_id" | ACCESS TOKEN CLIENT ID |
| 10 | | "ext:fname" | FIRST NAME |
| 11 | | "ext:lname" | LAST NAME |
| 12 | | "ext:locale" | LOCALE NAME |
| 13 | | "ext:tenantid@recm" | TENANT ID |
| 14 | | "ext:email@req" | E-MAIL ADDRESS |
| 15 | | "ext:appid" | APPLICATION ID |

Claims in a claim name class "Registered Claim" in Table 1 is claims preliminarily defined in JWT RFC7519 as follows. That is, "iss" (Issuer) represents an identifier of an issuer of JWT; "sub" (Subject) represents an identifier of a subject of JWT; "aud" (Audience) represents a list of identifiers of subjects assumed to use JWT; "exp" (Expiration Time) represents an expiration time of JWT; "nbf" (Not Before) represents date/time when JWT is valid; "iat" (Issued At) represents a time when JWT is issued; and "jti" (JWT aidhi) represents a unique identifier for JWT. The date/time to be designated for "exp", "nbt", and "iat" described above is represented by IntDate, which is a JSON value representing the number of seconds from 1970-01-01T0:0:0Z UTC to the date/time of designated UTC. The use of such "Registered Claims" is arbitrary.

In the present exemplary embodiment, the authentication/authorization server 102 that issues the signed access token sets values as follows. The URI of the authentication/authorization server 102 is set as "iss"; the Universally Unique Identifier (UUID) of a user is set as "sub"; and the URI of the resource server 103 is set as "aud". Further, 3600 seconds from the JWT issuance time, i.e., "iat" value+3600, is set as "exp", and the JWT issuance time, i.e., the same value as the value "iat", is set as "nbf". An access token ID of access token information is set as "jti".

In addition, according to JWS RFC7519, each claim in a claim name class "Private Claim" in Table 1 is a private claim name class used under an agreement between a JWT issuer and a user. Each claim in "Private Claim" is based on a premise that the claim does not conflict with another defined claim name. In the present exemplary embodiment, the claim name in the "Private Claim" class is characterized by including access token information (access token scope list "authz:scopes", access token client ID "authz:client_id"), and attribute information (first name "ext:fname", last name "ext:lname", locale name "ext:locale", tenant ID "ext:tenantid", e-mail address "ext:e-mail", and application ID "ext:appid") associated with the access token.

Specifically, in the present exemplary embodiment, the authentication/authorization server 102 that, issues the signed access token sets claims "authz:scopes" and "authz:client_id" as authorization information. Specifically, as "authz:scopes", the resource server 103 sets a scope list representing resources that are permitted to be acquired, and also sets "authz:client_id" representing the ID of the client that accesses the resource server 103 as "authz:client_id". The authentication/authorization server 102 that issues the signed access token sets the claim representing information about the user of the UUID set to "sub" as follows as attribute information associated with the token of "authz:tokened". Specifically, a first name is set as "ext:fname"; a last name is set as "ext:lname"; information about a locale to which the user belongs is set as "ext:locale"; an ID of a tenant to which the user belongs is set as "ext:tenantid"; and an e-mail address is set as "ext:e-mail". As "ext:appid", an application ID for identifying the resource server cooperation application 331 is set. Details thereof will be described below.

The authentication/authorization server 102 that issues the signed access token of the content as illustrated in Table 1 described above in the present exemplary embodiment encodes the claims in Table 1 described above as JSON by RFC7519 which is one of the JWT Table 1, i.e., JWS payload) with a digital signature according to the compact serialization specification of RFC7515 which is one of the JWS specifications is expressed and encoded as a compact URL-safe character string. The signed access token according to the present exemplary embodiment is a character string in which an encoded JWS header, an encoded JWS payload, and an encoded JWS signature are connected in this order using a period ('.') character as a delimiter, according to the JWS compact serialization specifications.

In the present exemplary embodiment, as the JWS header, "alg" (algorithm) for identifying a cryptographic algorithm used for JWS signature is used. Specifically, in the present exemplary embodiment, "RS256" (RSASSA-PKCS1_v1_5 using SHA-256) is used as "alg". The character string "RS256" is registered in an IANA JSON Web Signature and Encryption algorithms registry as the alg value and is defined in Section 3.1 of JSON Web Algorithm (JWA) specifications (RFC7518).

In the present exemplary embodiment, as a key pair of a secret key and a public key used in cryptographic algorithm "RS256" used for JWS signature, keys that are preliminarily generated by the authentication/authorization server 102 are used. A public key for verifying the JWS signature is preliminarily placed on the resource server 103 that uses the signed access token.

<Table Managed by Authentication/Authorization Server>

A flow of issuance and verification of a bearer access token and a signed access token according to the present exemplary embodiment will be described with reference to FIGS. 5, 6, and 7 and Tables 2 to 8. Tables 2 to 6 are tables managed by the authentication/authorization module 310 of the authentication/authorization server 102 in the present exemplary embodiment.

TABLE 2

USER MANAGEMENT TABLE

| USER ID (CLIENT ID) | UUID | Password | User Type |
|---|---|---|---|
| john.doe.@170BA | 1ce42f74 | ******** | User |
| 523ee20c9f39@2449baxt | 241332ca | ************** | Client |

The user management, table of Table 2 includes a user ID (client ID) item for uniquely managing users and clients, a universally unique identifier (UUID) item as an internal representation of a user ID (client ID), a Password item representing a password corresponding to the user ID, and a user type item representing a user type. The authentication/authorization module 310 includes a function (not illustrated) for verifying a pair of a user ID (client ID) and password information, and generating, if the pair of the user ID and the password information is correct, authentication information to authenticate each user or client.

TABLE 3

USER ATTRIBUTE MANAGEMENT TABLE

| UUID | First Name | Last Name | Tenant ID | Email | Service ID |
|---|---|---|---|---|---|
| 1ce42f74 | John | Doe | 170BA | john.doe@example.com | PrintService |
| 241332ca | client | device | 170BA | client.device@example.com | PrintService |

The user attribute management table of Table 3 includes a UUID item, a first name item representing the first name of each user of the UUID, a last name item representing the last name of each user, a tenant ID item representing a tenant to which each user belongs, an e-mail item representing an e-mail address, and service ID item representing available services.

TABLE 4

CLIENT ATTRIBUTE MANAGEMENT TABLE

| UUID | DEVICE SERIAL NUMBER | Redirect URL | Service ID |
|---|---|---|---|
| 241332ca | 12345678 | http://client.example.com/redirect | PrintService |

The client attribute management table of Table 4 includes a UUID item, a device serial number item representing a device to which a client is issued, a redirect URL item representing a redirect URL of a client that is used in an OAuth 2.0 (RFC6749) protocol or the like, and a service aidhi item representing services available for the client.

TABLE 5

SERVICE MANAGEMENT TABLE

| Service ID | Scope | URL |
|---|---|---|
| PrintService | owner.PrintService | https://print.srv.example.com |

The service management table of Table 5 includes a service ID item representing a service regarding the resource provided by the resource server 103, a scope item representing a service corresponding to the service ID as a resource and designated in a scope of an authorisation request in the OAuth 2.0 protocol or the like, and a URL item representing a URL of a resource server that provides the service (resource) corresponding to the service ID.

TABLE 6

TOKEN MANAGEMENT TABLE

| Token ID | Token Type | Expiration Time | Scopes | Grant Type |
|---|---|---|---|---|
| Aipzi | code | 600 | | authorization code |
| b2652 | access token | 1472710413 | owner.PrintService | Client Credentials |
| Refresh Token ID | Refresh Token Expiration Time | ClientUUID | OwnerUUID | ApplicationID |
| a2849 | 8640000 | 241332ca | 1ce42f74 | Print |

The token management table of Table 6 includes a token ID item representing a token ID, a token type item representing the token type of the token ID, such as an access token or authorization code, an expiration time item representing an expiration time of the token ID in seconds, a scope item representing a content to be designated in a scope of an authorization request of the OAuth protocol or the like, a grant type item representing the grant type of the token ID used in the OAuth protocol or the like, a refresh token ID item representing an ID of a refresh token corresponding to the token ID, a refresh token expiration time item representing the expiration time of the Refresh token ID in seconds, a client UUID item representing a client who has sent an issuance request corresponding to the token ID, an owner UUID item representing an owner associated with the token ID, and an application ID item representing the resource server cooperation application 331 that uses the token ID. The value of the application ID item is determined for each resource server cooperation application 331. The value is automatically acquired when the authentication/authorization server cooperation client 330 requests the resource server cooperation application 331 to issue a token, and the value is sent to the authentication/authorization module 310 of the authentication/authorization server 102.

<Issuance and Verification of Access Token>

FIG. 5 is a sequence diagram illustrating a flow of issuance and verification of a bearer access token and a signed access token according to the present exemplary embodiment. The issuance and verification of the bearer access token and the signed access token are implemented in cooperation by the authentication/authorization server 102, the resource server 103, and the client terminal 104. A symbol "Ref" in FIG. 5 represents a reference, and details thereof will be described below with reference to other FIGS. A symbol "Alt" represents conditional branch processing and only one of the processing is executed.

In step S501, the authentication/authorization server cooperation client 330 of the client terminal 104 requests the authentication/authorization server 102 to issue an access token. The access token issuance request from the authentication/authorization server cooperation client 330 includes a grant type designated for the authentication/authorization module 310 of the authentication/authorization server 102, and authentication information or authorization code corresponding to the grant type.

In step S502, the authentication/authorization module 310 of the authentication/authorization server 102 executes signed access token issuance processing. In step S502, a signed access token or a bearer access token is issued according to the value designated as the grant type. Details thereof will be described below with reference to FIG. 6.

In step S503, the resource server cooperation application 331 of the client terminal 104 requests the resource server 103 to provide a service. At this time, in step S503, the resource server cooperation application 331 sets the access token acquired from the authentication/authorization server 102 to the authorization header of a HTTP and requests the resource server 103 to provide a service.

In step S504, the resource server module 320 of the resource server 103 determines whether the access token received together with the service provision request is a signed access token or a bearer access token. If the received access token is a signed access token, it is determined whether verification processing in the resource server 103 is permitted. Details thereof will be described with reference to FIG. 8.

If it is determined that the resource server 103 executes the verification processing for the access token, in step S803, the resource server module 320 verifies the signed access token attached to the resource request.

In this case, in step S505, the resource server module 320 verifies the signature of the signed access token by using the public key that is preliminarily acquired form the authentication/authorization server 102. If the signature is appropriate, the processing proceeds to step S506.

In step S506, the resource server module 320 decrypts the signed access token and acquires attribute information about, the access token illustrated in Table 7, The resource server module 320 refers to the attribute information to determine whether the client terminal 104 which has requested the resource in step S503 has a sufficient authority. If it is determined that the client terminal 104 has the authority, the processing proceeds to step S509. As a result of step S506, if it is determined that the authority is insufficient for the resource requested by the client terminal 104, an error is sent back and the series of processing is terminated.

In step S509, the resource server module 320 executes processing for providing the resource requested by the client terminal 104 based on the result of step S506, and returns the processing result to the client terminal 104.

On the other hand, if it is determined that the access token verification processing is executed in the authentication/authorization server 102, in step S804, the resource server module 320 requests the authentication/authorization module 310 to verify the access token regardless of the type of the access token attached to the resource request. In this case, in step S507, the authentication/authorization module 310 is requested to verify the access token. In step S508, the authentication/authorization server 502 performs the access token verification processing, and returns the verification result to the resource server 503. The processing in steps S507 and S508 is similar to the access token verification processing of the related art illustrated in steps S404 and S405, and thus the descriptions thereof are omitted.

<Access Token Issuance Processing>

Figure 6:
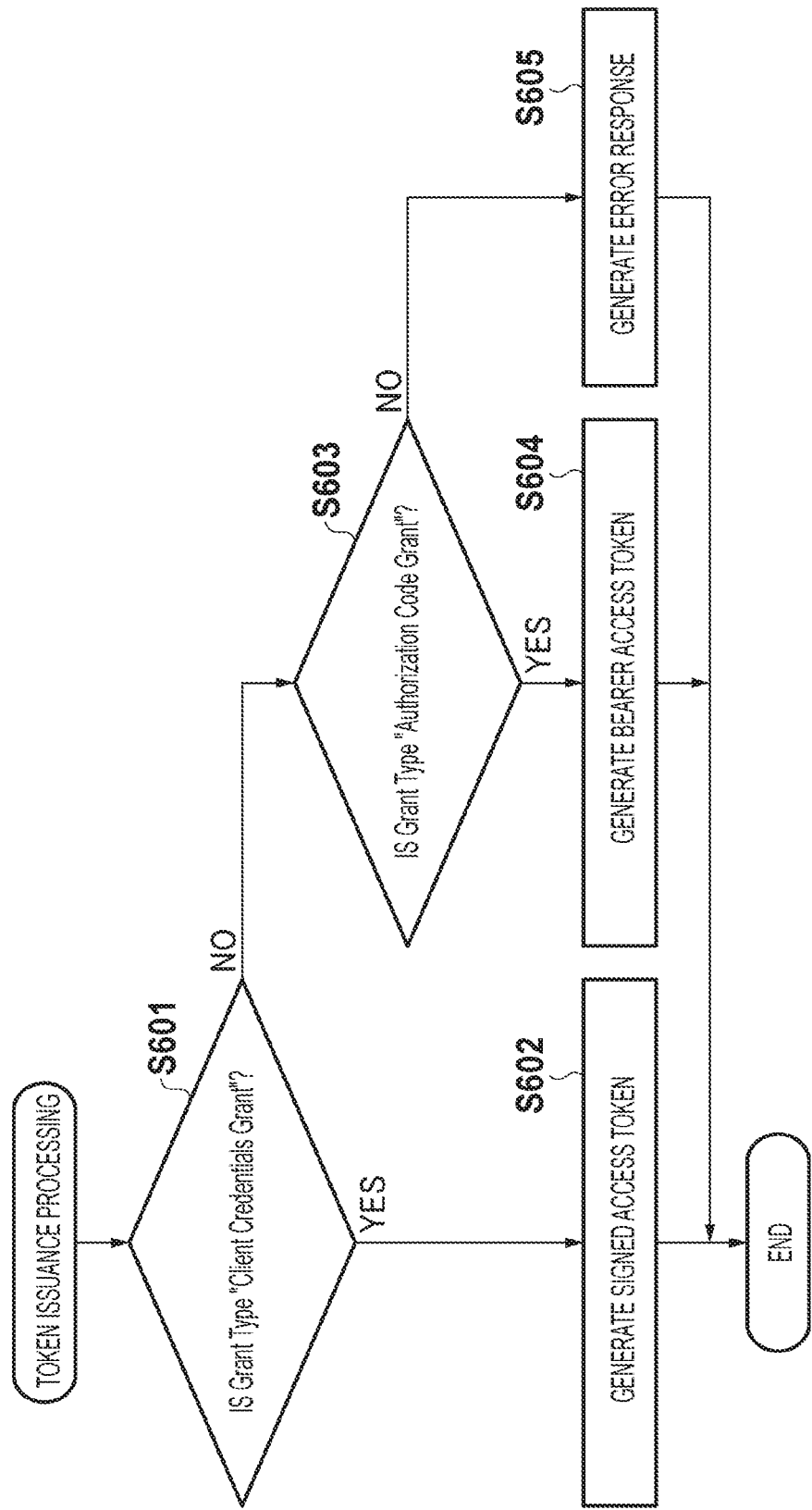
FIG. 6 is a flowchart illustrating processing for determining an access token issued according to a grant type.

FIG. 6 is a flowchart illustrating access token issuance processing performed by the authentication/authorisation module 310 in step S502. In step S601, the authentication/authorization module 310 performs authentication and authorization of the client or owner who has accessed and transmitted the access token issuance request. At this time, the authentication/authorization module 310 checks a request, such as a grant type, and determines whether the parameter indicates a Client Credentials Grant type request. Client Credentials Grant is a parameter set, for example, when client credentials are delivered to the server (resource server in this example) to request for the access token to be verified. Client Credentials Grant is used, for example, when the owner who carries out processing is a client terminal. The access token issued according to this request includes a credential as information for client authentication, and the credential corresponds to the signed access token.

FIG. 14 is a diagram illustrating an example of an HTTP request of an access token issuance request to be transmitted from the authentication/authorization server cooperation client 330 to the authentication/authorization module 310 in the present exemplary embodiment. Examples of the HTTP request to be transmitted from the authentication/authorization server cooperation client 330 to the authentication/authorization module 310 include a client credentials grant type request 1410 and an authorization code grant type request 1420. The credentials grant type request 1410 is a request in which "client_credentials" is set as the value of a Grant Type item 1411 in the HTTP request header.

The authorization code grant type request 1420 is a request in which "authorization_code" is set as the value of a Grant Type item 1421 in the HTTP request header.

Grant types are defined as illustrated in FIG. 14, and the authentication/authorization server cooperation client 330 may transmit these grant types.

The authentication/authorisation module 310 checks the value of the grant type item in the HTTP request header of the access token issuance request. If the grant type is "client_credentials", the processing proceeds to step S602, and in other cases, the processing proceeds to step S603.

In step S602, the authentication/authorization module 310 issues a signed access token according to information about the client successful in authentication and authorization, and transmits the signed access token to the authentication/authorization server cooperation client 330. The authentication/authorization module 310 performs values based on the data illustrated in Tables 2 to 6 regarding the values of the claims illustrated in Table 1 as the signed access token according to the present exemplary embodiment.

As the JWS header, "alg":"RS256" and "typ":"JWT" are set. In addition, the following values are set as the JWS payload. As the identifier "iss"(Issuer) of the JWT issuer, the URI "https://auth.example.com" of the authentication/authorization server 102 is set. As the identifier "sub" (Subject) of the subject of the JWT, UUID "241332ca" in Table 2 is set as the ID of the resource owner corresponding to the authorization code included in the access token issuance request.

As the list "aud" (Audience) of identifiers of subjects assumed to use JWT, "https://print.srv.example.com" in the URL item of Table 5 is set as the URL of the resource server corresponding to the scope. As the JWT expiration time "exp" (Expiration Time), 3600 seconds from the issuance time of the signed access token, i.e., "1472713413", which is "iat" value+3600, in the present exemplary embodiment, is set, AS "nbf", the value "1472709813" that is the same as that when the signed access token is issued, i.e., "iat" is set. In the present exemplary embodiment, as illustrated in the token management table of Table 6 in the case of issuing the signed access token, the token ID "b2652" of the signed access token is set as "jti".

"owner.PrintService" is set in the access token scope list "authz:scopes", and "241332ca" is set in the access token client ID "authz:client_id".

Further, as the attribution information associated with the access token, the values in Tables 2 to 5 are stored. The values of the first name item, the last name item, and the e-mail item in the user attribute management table of Table 3 are stored in "ext:fname", "ext:lname", "ext:e-mail" attributes, respectively. The values of "Client", "Device", and "client.device@example.com" are stored in the respective attributes.

Similarly, the value "170BA" in the tenant ID item of the user attribute management table of Table 3 is stored in the "ext:tenantid" attribute. "12345678" in the device serial number item of the client attribute management table of Table 4 is stored in the "ext:dev-serial" attribute. "print" is stored in the "ext:appid" attribute as the identifier of the resource server cooperation application 331 which has sent the token issuance request.

In sum, the JWS payload of the signed access token is designated as follows in step S602.

TABLE 7

JWS PAYLOAD DESIGNATED VALUES OF PRESENT EXEMPLARY EMBODIMENT

| | CLAIM NAME CLASS | CLAIM NAME | CLAIM DESIGNATED VALUE |
|---|---|---|---|
| 1 | Registered Claim | "iss" (Issuer) | https://auth.example.com |
| 2 | | "sub" (Subject) | 241332ca |
| 3 | | "aud" (Audience) | https://print.srv.example.com |
| 4 | | "exp" (Expiration Time) | 1472713413 |
| 5 | | "nbf" (Not Before) | 1472709813 |
| 6 | | "iat" (Issued At) | 1472709813 |
| 7 | | "jti" (JWT ID) | b2652 |
| 8 | Private Claim | "authz:scopes" | owner.PrintService |
| 9 | | "authz:client_id" | 241332ca |
| 10 | | "ext:fname" | Client |
| 11 | | "ext:lname" | Device |
| 12 | | "ext:locale" | en_US.utf-8 |
| 13 | | "ext:tenantid@recm" | 170BA |
| 14 | | "ext:email@req" | client.device@example.com |
| 15 | | "ext:appid" | Print |

Further, according to the compact serialization specifications of RFC7515 which is one of the JWS specifications, the JWS payload with a digital signature is expressed and encoded (BASE64 URL encoding) as a compact URL-safe character string. A character string is formed by connecting the encoded JWS header, the encoded JWS payload, and the encoded JWS signature in this order using a period ('.') character as a delimiter, and the authentication/authorization module 310 generates the signed access token as illustrated in FIG. 7.

FIG. 7 is a diagram illustrating an example of the signed access token generated by the authentication/authorization module 310 according to the present exemplary embodiment. In the case of requesting the resource server 103 to provide a service, the client terminal 104 sets the signed access token illustrated in FIG. 7 in the HTTP authorization header.

On the other hand, if it is determined in step S601 that the parameter does not indicate the Client Credentials Grant type, in step S603, the authentication/authorization module 310 determines whether the grant type of the access token issuance request is Authorization Code Grant. If the grant type is Authorization Code Grant, the processing proceeds to step S604 to issue a bearer access token to the authentication/authorization server cooperation client 330. The format of the access token issued in this step is similar to that issued in step S402.

If the grant type of the token issuance request is neither Client Credentials Grant nor Authorization Code Grant, the authentication/authorization module 310 proceeds to step S605 to return an error response to the authentication/authorization server cooperation client 330. Specifically, the response corresponds to an extension grant which is a grant type uniquely defined in the authentication/authorization module 310.

<Authorization Checking Processing>

FIG. 8 is a flowchart illustrating the authorization checking processing executed in step S504 by the resource server module 320. For convenience or illustration, steps S803 and S804 are also illustrated in FIG. 5.

In step S601, the resource server module 320 checks whether the access token received from the resource server cooperation application 331 is a signed access token. The access token is set to the HTTP request header and the resource server module 320 checks the content of the access token. When the signed access token as illustrated in FIG. 7 is set, the processing proceeds to step S802. If the access token received from the resource server cooperation application 331 is a bearer access token, the processing proceeds to step S804, and the resource server module 320 requests the authentication/authorization module 310 to verify the token.

In step S802, the resource server module 320 determines, based on the authorization checking table (illustrated in Table 8), whether the requested resource is a resource for which the resource server 103 itself may verify the access token, or a resource for which the authentication/authorization server module 310 needs to verify the access token. Depending on the determination result, if the requested resource is a resource for which the resource server itself may verify the access token, the processing proceeds to step S803, and the signature of the signed access token is verified using the public key that is preliminarily acquired from the authentication/authorization server. If the requested resource is a resource for which the authentication/authorization module 310 needs to verify the token, the processing proceeds to step S804, and the resource server module 320 requests the authentication/authorization module 310 to verify the token.

Table 8 is an authentication/authorization table that is managed by the resource server module 320 of the resource server 103 in the present exemplary embodiment and is referred to in step S802.

TABLE 8

AUTHORIZATION CHECKING TABLE

| Service ID | Resource Name | SIGNED ACCESS TOKEN PERMITTING INFORMATION |
|---|---|---|
| PrintService | Resource1 | PERMIT |
| PrintService | Resource2 | PROHIBIT |

The authorization checking table of Table 8 includes a service ID item representing a service provided by the resource server 103, a resource name item representing the name of a resource provided by the resource server 103, and a signed access token permitting information item representing whether to permit the signed access token in association with the resource during a request for the resource. The authorization checking table is preliminarily set for, for example, each service and resource. If the value of the signed access token permitting information item for the resource for which the request is received by the resource server module 320 indicates "permit", the processing proceeds to step S803, and if the value indicates "prohibit", the processing proceeds to step S804. The contents of steps S803 and S804 are as illustrated in FIG. 5.

For example, when the resource is required by an administrator authority among the resources provided by the resource server 103, the resource may be a resource for which it is necessary to check whether the access token has an authority right now when the request is accepted. When the signed access token has an authority at the issuance timing, the resource may be provided within the expiration time, even if the authority is lost at the time of the resource request. Such a determination is made based on how strictly the expiration time set to the signed access token and the authority necessary for resource provision are to be managed. For example, in a case where the authority is a paid authority and the number of authorities to be attached is limited, if the expiration time of a signed access token is sufficiently long, processing of removing the authority after the issuance of the signed access token and issuing a signed token after attaching the authority to another user is repeated, so that the limitation in the number of authorities to be attached may be merely a matter of formality. In such a case, the access token to be verified is desirably a bearer access token to be verified based on the setting of the authority not during the issuance, but during the verification. Accordingly, in such a case, the signed access token permitting information is set to "prohibit". The authorization checking table of Table 8 is set for each resource in consideration of the conditions as described above.

By the series of processing described above, the resource server 103 can eliminate the need for requesting the authentication/authorization server 102 to verify the token for all resource requests from the client terminal 104. As a result, the load on the authentication/authorization server 102 decreases. Further, by the authorization checking processing in step S504, the resource for which the token verification is permitted by the resource server 103 itself using the signed access token is specified, thereby making it possible to flexibly maintain the capacity of the resource provided by the resource server 103.

As described above, the access token verification processing can be distributed to the authentication/authorization server 102 and the resource server 103. This prevents concentration of verification processing requests on the authentication/authorization server. Further, the execution of the verification processing by the resource server enables a reduction in latency of the verification processing. Furthermore, the bearer access token is issued for authorities or resources that are not suitable for issuance of the signed access token. Accordingly, the authentication/authorization server can verify the access token according to the authority or the like not during issuance of the access token, but during verification. It is also possible to provide a flexible resource according to a subject that requests a resource.

Further, in the present exemplary embodiment, the client can control whether to perform the verification of the access token in the resource server or in the authentication/authorization server, by using a parameter set to the access token issuance request. Accordingly, for example, if the registered client or user is deleted from the authentication/authorization server after issuance of the access token, or the authority or attribute is changed, the client may request issuance of a bearer access token. On the contrary, for example, if it is less likely that the client or user may be deleted after issuance of the access token, or the authority or attribute may be changed, the client may request issuance of a signed access token. Thus, a criterion for determining whether a signed access token or a bearer access token is requested for the client, thereby enabling selection of the server that verifies the access token. Further, the selection of the client may also be overwritten by the authorization checking table of the authentication/authorization server 102, thereby preventing the client's selection from being dependent only on arbitrary selection by the client.

Second Exemplary Embodiment

The first exemplary embodiment illustrates a method for appropriately managing resources by determining the signed access token issuance conditions in the authentication/authorization server 102 and the signed access token verification execution conditions in the resource server 103. As described above, the signed access token has a constraint that the current information associated with the token cannot be reflected in the token verification. Depending on the resource provided by the resource server 103, a resource for which the current information is necessary for token verification may be required even if the authority for the resource is controlled by the signed access token.

For example, when the authentication/authorization server 102 executes processing for deleting the issued signed access token, only the reference to some resources is permitted within a valid period of the signed access token. However, it is assumed that control is performed not to permit updating. Further, since a resource request from a specific client terminal is blocked, due to information leak or the like, it is also assumed that the client terminal information registered in the authentication/authorization server 102 is deleted.

Figure 9:
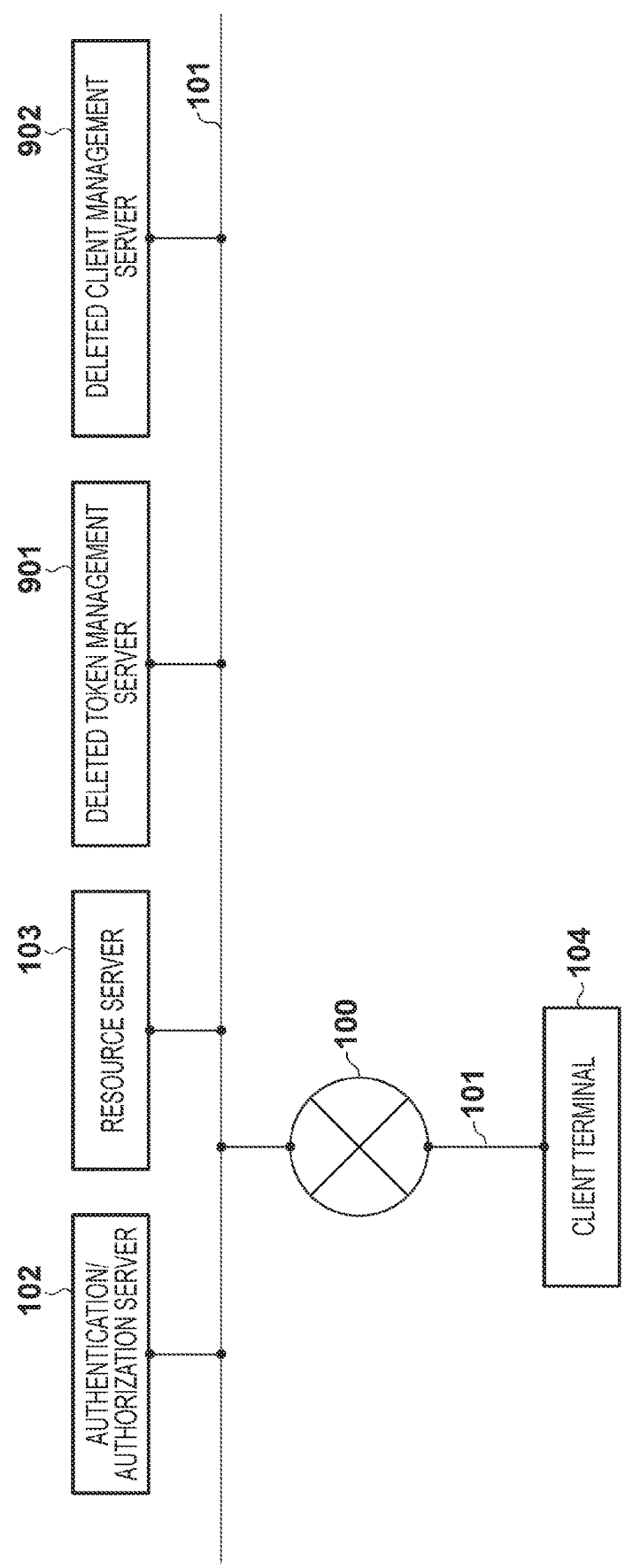
FIG. 9 is a network configuration diagram according to a second exemplary embodiment.

In a second exemplary embodiment, deletion of an access token and deletion of a client are checked during verification of the access token in the resource for which the authority is controlled by the signed access token as described above, and appropriate control is carried out. An authentication/authorization system which is an information processing system according to the present exemplary embodiment is implemented on a network having a configuration as illustrated, in FIG. 9. The configuration according to the present exemplary embodiment is a configuration in which a deleted token management server 901 and a deleted client management server 902 are added to the configuration of FIG. 1 illustrated in the first exemplary embodiment.

The deleted token management server 901 is a server that manages and provides information about deleted access tokens among the access tokens managed by the authentication/authorization server 102.

The deleted client management server 902 is a server that manages and provides deleted client information in the client information managed by the authentication/authorization server 102. The number of each of the deleted token management server 901 and the deleted client management server 902 is one. However, a plurality of deleted token management servers 901 and a plurality of deleted client management servers 902 may be provided. The servers are connected via the LAN 101, but instead may be connected via the WAN 100. The deleted token management server 901 and the deleted client management server 902 may be connected via a database server and a LAN (not illustrated) and store data used for each server module described below. Further, the deleted token management server 901 and the deleted client management server 902 may be configured on the same server.

Figure 10:
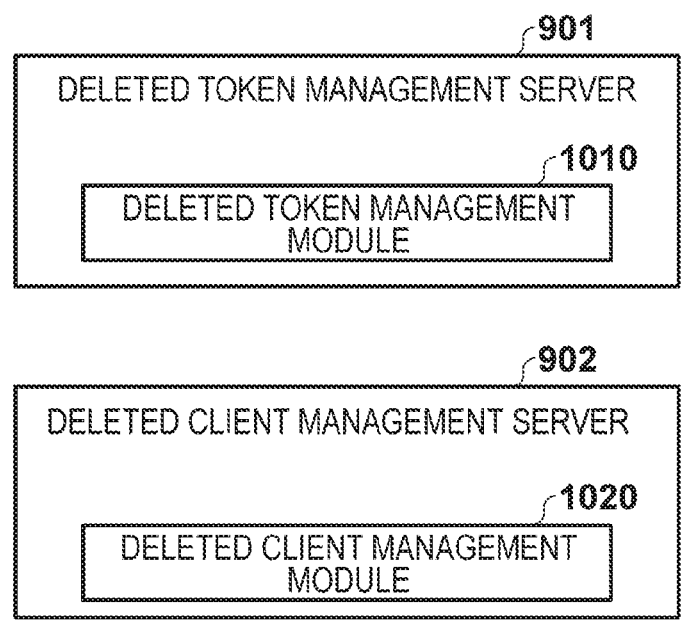
FIG. 10 is a software configuration diagram according to the second exemplary embodiment.

FIG. 10 is a diagram illustrating a software module configuration for each of the deleted token management server 901 and the deleted client management server 902 according to the present exemplary embodiment. Each module is executed, by each constituent element, thereby implementing each function. The deleted token management server 901 includes a deleted token management module 1010. The deleted token management module 1010 performs processing for receiving the token ID of the deleted access token from the authentication/authorization server 102 and processing for transmitting the token ID of the deleted access token to the resource server 104.

The deleted client management server 902 includes a deleted client management module 1020. The deleted client management module 1020 performs processing for receiving the client ID of the deleted client from the authentication/authorization server 102, and processing for transmitting the client ID of the deleted client to the resource server 104.

<Deletion of Issued Access Token and Deletion of Registered Client Information>

Figure 11:
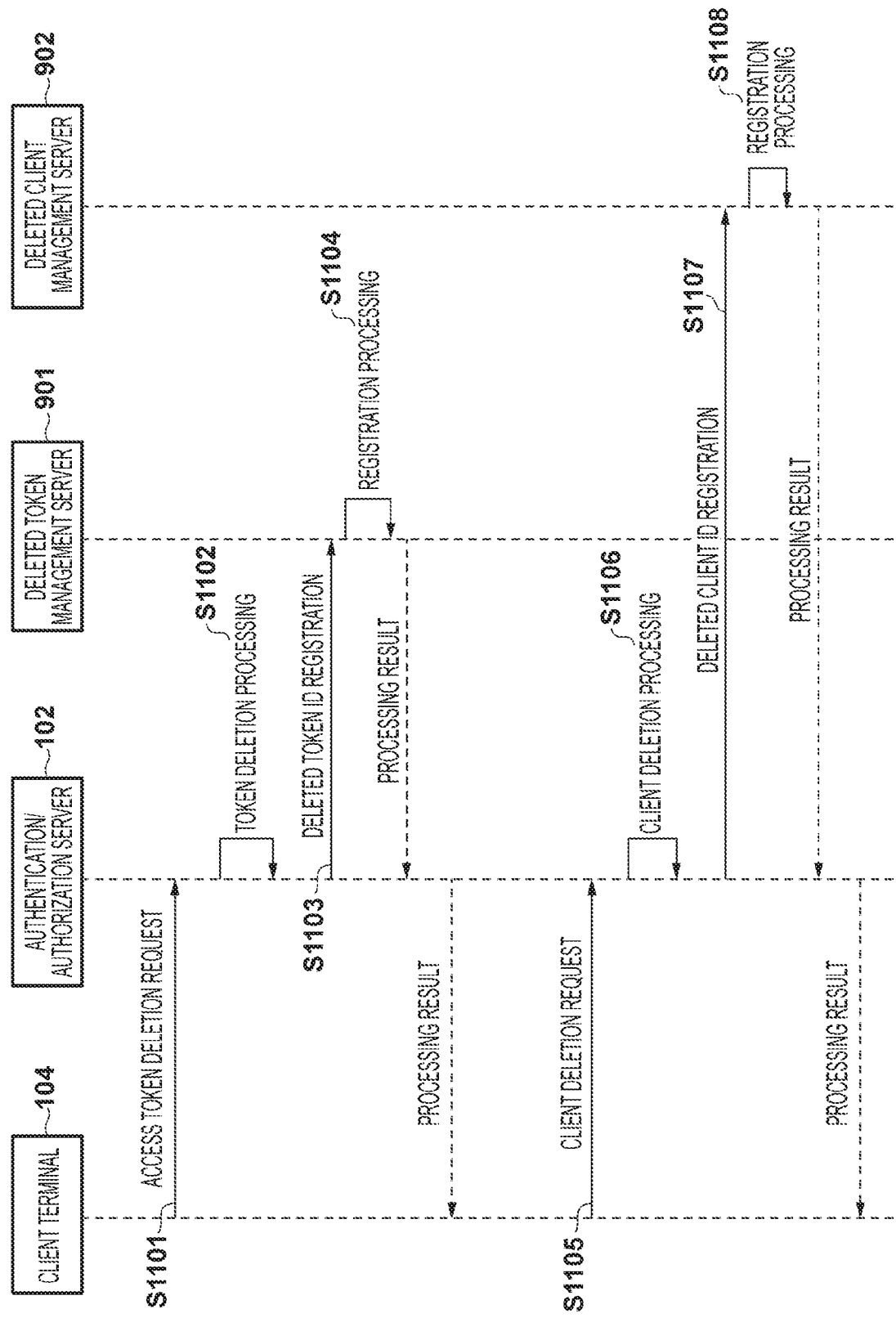
FIG. 11 is a flowchart illustrating processing for deleting an access token and a client.

FIG. 11 is a sequence diagram illustrating a flow of deletion of an issued access token and deletion of registered client information in the authentication/authorization server 102. Deletion of the issued access token and deletion of the registered client are implemented in cooperation by the authentication/authorization server 102, the deleted token management server 901, and the deleted client management server 902. Issued access token deletion processing and client information deletion processing are processing that can be executed only the user who owns the administrator authority in the authentication/authorization server 102.

In step S1101, the administrator user of the authentication/authorization server 102 designates the token ID to be deleted and transmits the access token deletion request to the authentication/authorization server 102 via the client terminal 104.

In step S1102, the authentication/authorization module 310 of the authentication/authorization server 102 deletes the access token information corresponding to the token ID received from the client terminal 104 in step S1101 from the token management table of Table 6.

In step S1103, the authentication/authorization module 310 transmits, to the deleted token management server 901, the token ID of the access token information that is successfully deleted in step S1102.

In step S1104, the deleted token management module 1010 of the deleted token management server 901 registers the token ID received from the authentication/authorization module 310 in a deleted access token ID management table.

Table 9 is the deleted access token ID management table that is managed by the deleted token management module 1010 of the deleted token management server 901 in the present exemplary embodiment.

TABLE 9

DELETED ACCESS TOKEN ID MANAGEMENT TABLE

| Token ID | Expiration Date |
|---|---|
| b2652 | 2017 Jan. 1 T12:00Z |

The deleted access token ID management table of Table 9 includes a token ID item representing the token ID of an access token, the deletion of which is completed in the authentication/authorization server 102, and an expiration date item representing a time when the deletion of the access token is completed in the authentication/authorization server 102. Thus, the access token deletion processing is completed. Step S1105 and subsequent steps correspond to client deletion processing, which is originally separated from access token deletion processing.

In step S1105, the administrator user of the authentication/authorization server 102 designates the client ID to be deleted and transmits the client deletion request to the authentication/authorization server 102 via the client terminal 104.

In step S1106, the authentication module 310 of the authentication/authorization server 102 deletes the client information corresponding to the client ID received, from the client terminal 104 in step S1105 from the user management table of Table 2. The client attribute information corresponding to the value of the UUID item in the deleted client information is deleted from the client attribute management table of Table 4.

In step S1107, the authentication/authorization module 310 transmits, to the deleted client management server 902, the client ID of the client information that is successfully deleted in step S1106.

In step S1108, the deleted client management module 1020 of the deleted client management server 902 registers the client ID received from the authentication/authorization module 310 in a deleted client ID management table.

Table 10 is the deleted client ID management table that is managed by the deleted client management module 1020 of the deleted client management server 902 in the present exemplary embodiment.

TABLE 10

DELETED CLIENT ID MANAGEMENT TABLE

| Client ID | Expiration Date |
|---|---|
| 523ee20c9f39@2449baxt | 2017 Jan. 1 T12:00Z |

The deleted client ID management table of Table 10 includes a client ID item representing the client ID of the client, the deletion of which is completed in the authentication/authorization server 102, and an expiration date item representing a time when the deletion of the client is completed in the authentication/authorization server 102.

Examples of the state where an access token is deleted before the expiration time of the access token issued once is expired include a case where the user belonging to the tenant is deleted. Examples of a state where a client is deleted include a case where, when a security problem, such as unauthorized leakage of the authentication/authorization server cooperation client 330 of the client, occurs, communication from the client is blocked thereafter.

<Issuance and Verification of Signed Access Token>

Figure 12:
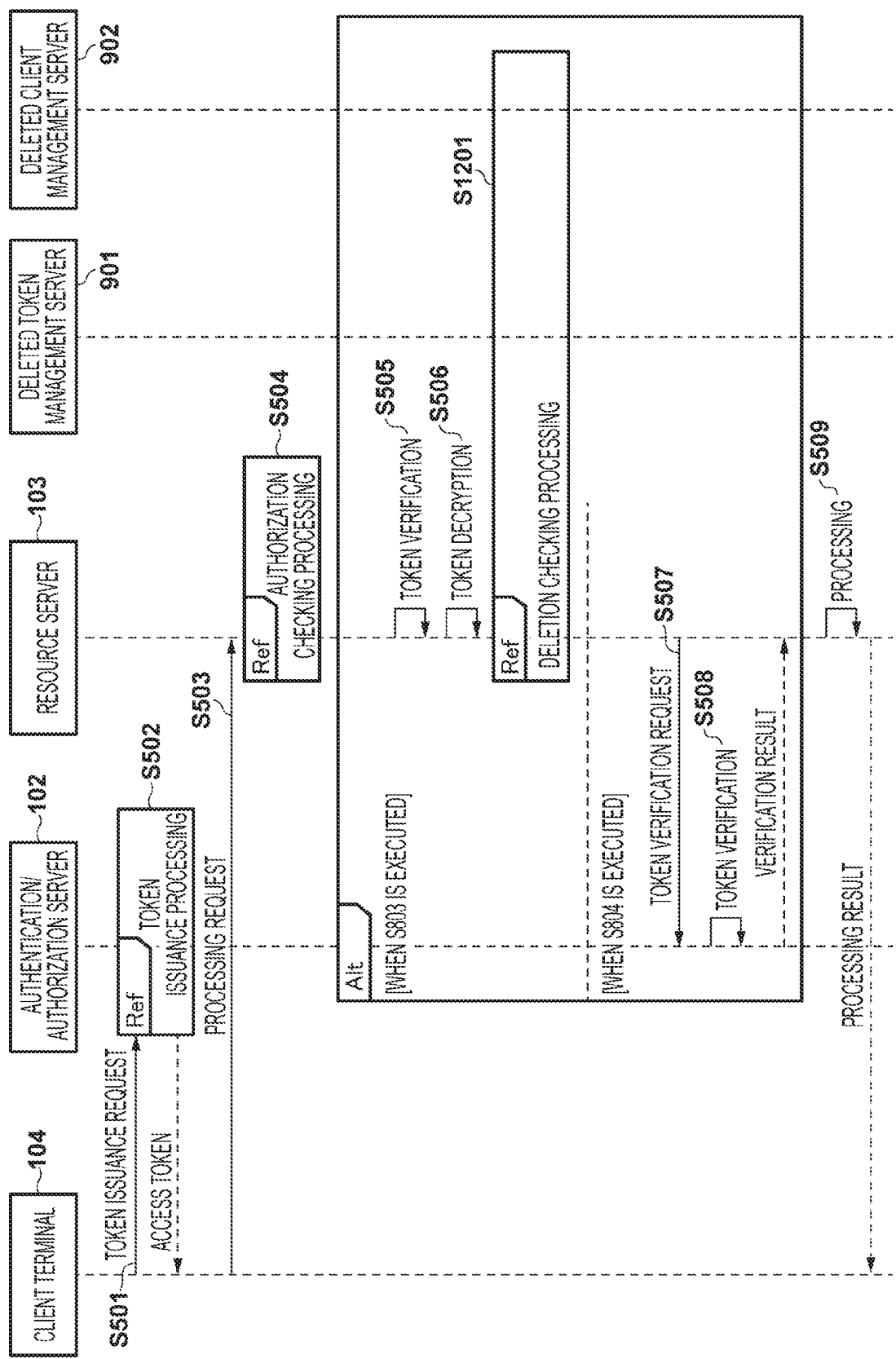
FIG. 12 is a diagram illustrating a processing request sequence according to the second exemplary embodiment.

FIG. 12 is a sequence diagram illustrating a flow of issuance and verification of a signed access token according to the present exemplary embodiment. This sequence diagram illustrates a flow of a series of processing for verifying a token after determining whether the token and client associated with the resource requested from the client terminal 104 during verification of the token in the resource server 103 is deleted. The token and client deletion checking processing in the present exemplary embodiment is executed in the sequence of FIG. 5 illustrated in the first exemplary embodiment after step S506. The token issuance and verification processing is similar to that of FIG. 5 illustrated in first exemplary embodiment.

In step S1201, the resource server module 320 of the resource server 103 executes access token and client deletion checking processing. Details thereof will be described with reference to FIG. 13.

<Deletion Checking Processing>

Figure 13:
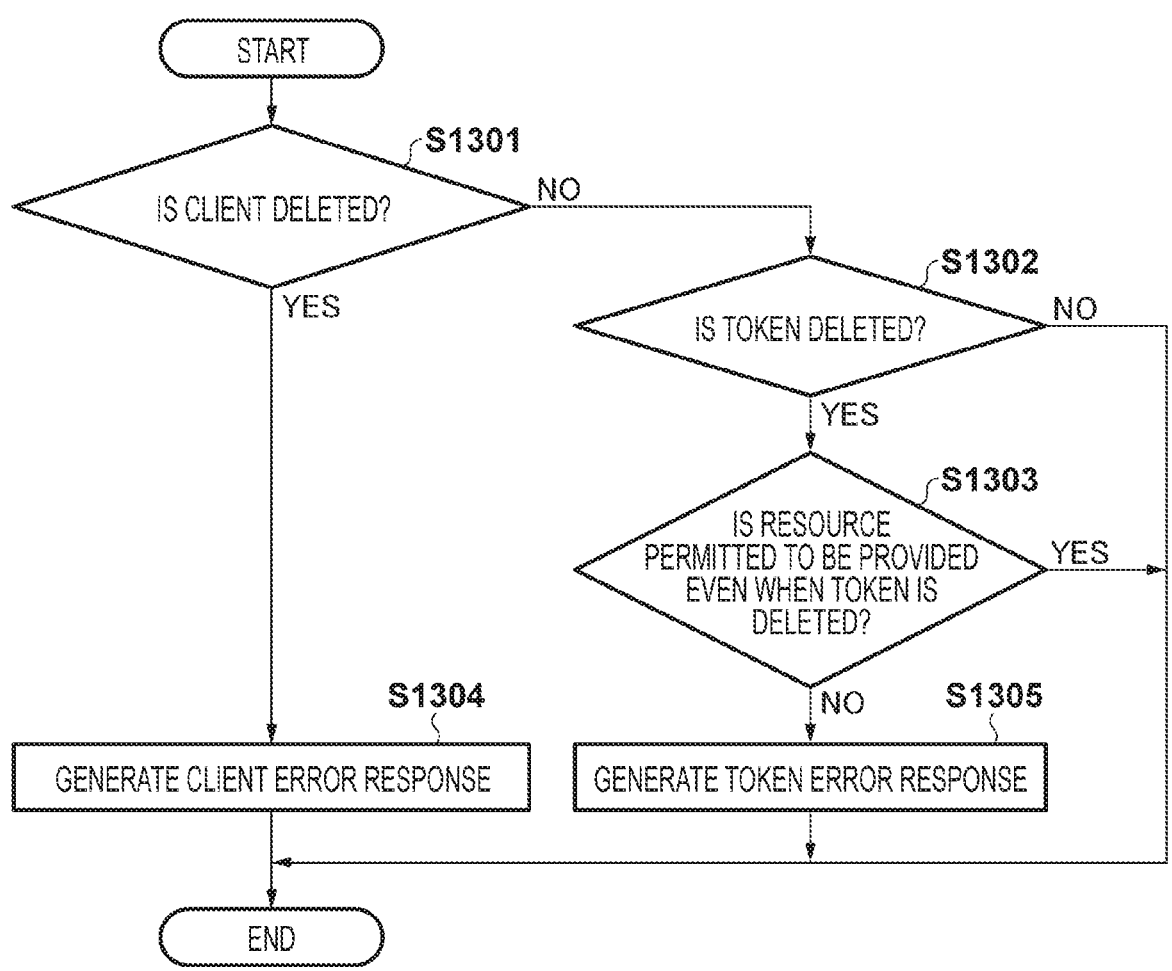
FIG. 13 is a flowchart illustrating token and client checking processing carried out in step S1201 by the resource server 103 in the second exemplary embodiment.

FIG. 13 is a flowchart illustrating the deletion server module 320.

In step S1301, the resource server module 320 determines whether the authentication/authorization server cooperation client 330 of the client terminal 104, which has requested the received processing request, is deleted in the authentication/authorization server 102. Specifically, the resource server module 330 determines whether the client ID of the authentication/authorization server cooperation client 330, which has sent the processing request, is registered in the deleted client ID management table illustrated in Table 10 of the deleted client management server 902. When the client ID is registered, the resource server 103 determines that the client terminal 104 which has transmitted the processing request is deleted from the authentication/authorization server 102, proceeds to step S1304 to generate an error response, and transmits the error response to the client terminal 104. In other words, in this case, the request for the resource is rejected. When the client ID is not registered, the resource server 103 determines that the client terminal 104 which has transmitted the processing request is valid, and the processing proceeds to step S1302.

In step S1302, the resource server module 320 determines whether the received signed access token is deleted in the authentication/authorization server 102. Specifically, the resource server module 330 determines whether the token ID of the received signed access token is registered in the deleted token ID management table illustrated in Table 9 of the deleted token management server 901, If the token ID is registered, the resource server module 330 determines that the received signed access token is deleted from the authentication/authorization server 102, and the processing proceeds to step S1303.

If the client ID is not registered, the resource server module 330 determines that the received signed access token is valid, and the processing proceeds to step S509 to execute processing.

In step S1303, the resource server module 330 determines whether the processing request target resource is a resource that can be executed even when the signed access token is deleted in the authentication/authorization server 102.

Table 11 is a table managed by the resource server module 330 in the present exemplary embodiment.

TABLE 11

EXECUTION PERMISSION RESOURCE MANAGEMENT TABLE

| Service ID | Resource Name | EXECUTION PERMISSION INFORMATION | PERMITTED PROCESSING |
|---|---|---|---|
| PrintService | Resource1 | PROHIBIT | — |
| PrintService | Resource2 | PROHIBIT | — |
| PrintService | Resource3 | PERMIT | Read |

An execution permission resource management table of Table 11 includes a service ID item representing a service provided by the resource server 103, a resource name item representing the name of a resource provided by the resource server 103, an execution permitting information item representing whether to permit execution of processing, even when the signed access token is deleted during resource request, in association with the resource, and a permitted processing item representing a specific processing type when the execution of processing is permitted.

For example, Table 11 shows that, if the signed access token is deleted during processing request, the execution of read processing for a resource Resources of a service PrintService is permitted within an expiration time.

If the resource server module 330 determines, in step S1303, that the processing request target is permitted on the execution permission resource management table, the processing of FIG. 5 is directly finished even when the signed access token is deleted in the authentication/authorization server 102. Accordingly, the processing proceeds to step S509 to execute the requested processing. On the other hand, if it is determined in step S1303 that the processing request target is prohibited on the execution permission resource management table, the processing proceeds to step S1305 to generate an error response, and the generated error response is transmitted to the client terminal 104.

In step S1304, the resource server module 330 creates a response including an error message indicating that the client information corresponding to the authentication/authorization server cooperation client 330 of the client terminal 104 is deleted from the authentication/authorization server 102, and transmits the response to the client terminal 104.

In step S1305, the resource server module 330 creates a response including an error message indicating server cooperation application 331 is deleted from the authentication/authorization server 102, and transmits the response to the client terminal 104.

As described above, the resource server 103 sends an inquiry to each of the deleted token management server 901 and the deleted client management server 902 which are external servers for checking the deletion of the token and client. However, the load on the authentication/authorization server 102 can be reduced. The state of each of the access token and the client can be checked during the token verification which is a constraint of the signed access token, and thus the resource server can flexibly provide the client terminal 104 with resources.

Accordingly, even when the issued access token or client managed by the authentication/authorization server 102 is deleted, control can be performed in such a manner that the use of the access token already issued is limited, or the use of the access token is permitted by limiting the authority, or without limiting the authority. Consequently, it is possible to issue a signed access token and cause the resource server to verify the signed access token, even if there is a possibility that the access token or client registered during issuance of the signed access token may be deleted, even after the issuance of the signed access token. Therefore, the load on the authentication/authorization server 102 can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium, may include, for example, one or more of a hard disk, a random-access memory (RAM), a read only memory (ROM), a storage of distributed computing systems, an versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent, structures and functions.

This application claims the benefit of Japanese Patent Application No. 2017-061886, filed Mar. 27, 2017, which is hereby incorporated by reference herein in its entirety.

What is claimed is:

1. An authorization server configured to issue an access token for accessing a resource provided by a resource server, the authorization server comprising:
   at least one memory storing instructions; and
   at least one processor that, upon execution of the instructions, is configured to perform operations including:
   receiving an issuance request from a client for an access token, wherein the issuance request includes a predetermined parameter that identifies a type of access token to be issued, wherein the type of access token to be issued is one of the following: a first type of access token configured to be verified by the resource server or a second type of access token configured to be verified by the authorization server,
   checking grant type information included in the issuance request, wherein the grant type information is information indicating whether an owner of the resource to be accessed by the client is the client or is other entity that is not the client,
   issuing, in a case where the authorization server determines that the grant type information indicates that the owner of the resource is the client, the first type of access token configured to be verified by the resource server, and issuing, in a case where the authorization server determines that the grant type information indicates that the owner of the resource is the other entity that is not the client, the second type of access token configured to be verified by the authorization server,
   transmitting, to the client from which the issuance request was received, the issued first type of access token or the issued second type of access token,
   receiving, from the resource server and in a case where the resource server determines that a request for the resource received from the client does not include the first type of access token, the second type of access token transmitted together with a verification request, and
   verifying, at the authorization server, the second type of access token received with the verification request from the resource server.

2. The authorization server according to claim 1, wherein the first type of access token is a signed access token and the second type of access token is a bearer access token.

3. The authorization server according to claim 1, wherein, if it is determined that the access token verification processing is to be executed in the authorization server, the authorization server receives a request from the resource server to verify the access token regardless of the type of access token attached to a resource request.

4. The authorization server according to claim 3, wherein, in a case where a signed access token that is issued at a timing has an authority at the issuance timing the resource is provided within an expiration time, even if the authority is lost at the time of the resource request.

5. The authorization server according to claim 1, wherein the grant type information indicates that a grant type is one of a client credentials grant type request or an authorization code grant type request.

6. The authorization server according to claim 1, wherein the resource server (i) is configured to determine whether to verify the access token for a resource request in a way that decreases load on the authorization server, (ii) is configured to verify the access token for the resource request, and (iii) is configured to determine whether to execute processing to provide the resource requested by the client to the client based on flexibly maintaining capacity of the resource provided by the resource server.

7. The authorization server according to claim 1, wherein the authorization server is configured to allow the client to control whether to perform the verification of the access token in the resource server or in the authorization server.

8. The authorization server according to claim 1, wherein, the authorization server is configured to receive, from the client, a request to issue a bearer access token or a signed access token based on a predetermined likelihood that an authority or attribute associated with the issued access token will be changed, and to overwrite the type of access token requested from the client to prevent the client's selection from being dependent only on arbitrary selection by the client.

9. The authorization server according to claim 1, wherein, in a case where the resource server receives the first type of access token configured to be verified by the resource server and determines that verification processing in the resource server is not permitted, the verification request is received by the authorization server from the resource server.

10. The authorization server according to claim 1, wherein the client is one of the following: a personal computer, a mobile terminal, or an image forming apparatus.

11. A resource server to provide a resource, the resource server comprising:
    at least one memory storing instructions; and
    at least one processor that, upon execution of the instructions, is configured to perform operations including:

determining whether an access token received together with a request for the resource is a first type of access token configured to be verified by the resource server, or a second type of access token configured to be verified by an authorization server, determining, when the received access token is determined to be the first type of access token, whether the resource server is permitted to verify the received first type of access token for the requested resource, and performing verification of the first type of access token in response to a determination that the verification by the resource server of the first type of access token is permitted, wherein the authorization server is configured to check grant type information included in an issuance request from a client, wherein the grant type information is information indicating whether an owner of the resource to be accessed by the client is the client or is other entity that is not the client, wherein, in a case where the authorization server determines that the grant type information indicates that the owner of the resource is the client, the authorization server issues the first type of access token configured to be verified by the resource server, and, in a case where the authorization server determines that the grant type information indicates that the owner of the resource is the other entity that is not the client, the authorization server issues the second type of access token configured to be verified by the authorization server, and wherein the resource server receives the access token issued by the authorization server.

12. The resource server according to claim 11, further comprising a first table stored in the at least one memory, wherein the first table includes information, stored in association with the resource, that indicates whether to perform the verification of the first type of access token received together with the request for the resource, wherein determination to permit the verification of the first type of access token is made using the first table.

13. The resource server according to claim 11, further comprising a second table stored in the at least one memory, wherein the second table includes information that indicates whether to permit provision of the resource when the first type of access token is issued and is registered in the authorization server, wherein, in a case where the second table indicates to permit provision of the resource, the first type of access token is verified by the resource server, even when the first type of access token is deleted from the authorization server.

14. The resource server according to claim 13, wherein execution of the instructions further causes the at least one processor to perform operations including:

sending, when the first type of access token is received by the resource server, an inquiry to a deleted token management server configured to manage the first type of access token deleted from the authorization server, and querying the second table to determine whether to permit provision of the resource when a response indicating that the first type of access token is deleted from the authorization server is received.

15. The resource server according to claim 11, wherein the authorization server is configured to store information identifying the client who requested the resource server to provide the resource, and wherein execution of the instructions further causes the at least one processor to perform operations including rejecting the request for the resource by the client when it is determined that the client is deleted from the authorization server.

16. The resource server according to claim 15, wherein execution of the instructions further causes the at least one processor to perform operations including:

sending, when the request for the resource is received from the client, an inquiry to a client management server configured to manage the client determined to be deleted from the authorization server, and rejecting the request for the resource from the client when a response indicating that the client is deleted from the authorization server.

17. The resource server according to claim 11, wherein, based on a determination that the access token received together with the request for the resource is the second type of access token, execution of the instructions further causes the at least one processor to perform operations including:

transmitting, to the authorization server, a verification request with the received second type of access token, and providing the requested resource to the client that issued the request based on successful verification by the authorization server of the second type of access token transmitted to the authorization server.

18. The resource server according to claim 11, wherein the first type of access token is a signed access token and the second type of access token is a bearer access token.

19. A method for an authorization server configured to issue an access token for accessing a resource provided by a resource server, the method comprising:

receiving an issuance request from a client for an access token, wherein the issuance request includes a predetermined parameter that identifies a type of access token to be issued, wherein the type of access token to be issued is one of the following: a first type of access token configured to be verified by the resource server or a second type of access token configured to be verified by the authorization server;

checking grant type information included in the issuance request, wherein the grant type information is information indicating whether an owner of the resource to be accessed by the client is the client or is other entity that is not the client;

issuing, in a case where the authorization server determines that the grant type information indicates that the owner of the resource is the client, the first type of access token configured to be verified by the resource server, and issuing, in a case where the authorization server determines that the grant type information indicates that the owner of the resource is the other entity that is not the client, the second type of access token configured to be verified by the authorization server;

transmitting, to the client from which the issuance request was received, the issued first type of access token or the issued second type of access token;

receiving, from the resource server and in a case where the resource server determines that a request for the resource received from the client does not include the first type of access token, the second type of access token transmitted together with a verification request, and verifying, at the authorization server, the second type of access token received with the verification request from the resource server.

\* \* \* \* \*